United States Patent [19]
Kimura et al.

[11] Patent Number: 5,265,204
[45] Date of Patent: *Nov. 23, 1993

[54] METHOD AND APPARATUS FOR BIT OPERATIONAL PROCESS

[75] Inventors: Koichi Kimura, Yokohama; Toshihiko Ogura, Ebina; Hiroaki Aotsu, Yokohama; Kiichiro Urabe, Hadano, all of Japan

[73] Assignee: Hitachi, Ltd., Tokyo, Japan

[*] Notice: The portion of the term of this patent subsequent to Dec. 29, 2009 has been disclaimed.

[21] Appl. No.: 836,738

[22] Filed: Feb. 19, 1992

Related U.S. Application Data

[63] Continuation of Ser. No. 641,064, Jan. 14, 1991, Pat. No. 5,175,816, which is a continuation of Ser. No. 779,794, Sep. 24, 1985, Pat. No. 5,034,900.

[30] Foreign Application Priority Data

Oct. 5, 1984 [JP] Japan .................. 59-208257
Oct. 5, 1984 [JP] Japan .................. 59-208267

[51] Int. Cl.⁵ .............................................. G06F 15/20
[52] U.S. Cl. ................................. 395/166; 395/162
[58] Field of Search ........................... 395/162–166, 395/400, 425; 340/750, 798–800

[56] References Cited

U.S. PATENT DOCUMENTS

| | | | |
|---|---|---|---|
| 4,023,023 | 5/1977 | Bourrez et al. | 364/200 X |
| 4,058,711 | 11/1977 | Onderein et al. | 364/900 X |
| 4,103,329 | 7/1978 | Davis et al. | 364/200 |
| 4,109,310 | 8/1978 | England et al. | 364/200 |
| 4,130,868 | 12/1978 | Heuer et al. | 364/200 |
| 4,135,242 | 1/1979 | Ward et al. | 364/200 |
| 4,212,076 | 7/1980 | Conners | 364/706 |
| 4,251,864 | 2/1981 | Kindell et al. | 364/200 |
| 4,363,091 | 12/1982 | Pohlman, III et al. | 364/200 |
| 4,435,792 | 3/1984 | Bechtolsheim | 365/230 |
| 4,449,184 | 5/1984 | Pohlman, III et al. | 364/200 |
| 4,644,503 | 2/1987 | Bantz et al. | 364/521 X |
| 4,648,046 | 3/1987 | Copenhaver et al. | 364/518 |
| 4,648,049 | 3/1987 | Dines et al. | 364/521 |
| 4,692,859 | 9/1987 | Oh | 364/200 |
| 4,862,150 | 8/1989 | Katsura et al. | 340/703 |
| 5,175,816 | 12/1992 | Kimura et al. | 395/162 X |

FOREIGN PATENT DOCUMENTS 40-24644 10/1940 Japan .
59-136831 8/1984 Japan .

OTHER PUBLICATIONS

Hitachi 16 Bit Microcomputer HD63484 ACRTC Advanced CRT controller, 4th edition Mar. 1988, pp. 98, 204, 205.

Primary Examiner—Heather R. Herndon

[57] ABSTRACT

A bit operation processor having a first address operation unit for updating the address of data in units of byte or multipled bytes for performing operation in units of byte or multiple of bytes, a second address operation unit for updating the address of data in units of bit or multiple of bits, an address control means operating on the first address operation unit to advance the address in response to the result of address advancement by the second address operation unit, and means for fetching byte-wide data for operation as addressed by the first address operation unit, whereby operation between data of any number of bits at any positions in byte blocks is controlled simply and fast.

182 Claims, 23 Drawing Sheets

FIG. 8

| WN | | | | Hex | BIT WIDTH (BITS) |
|---|---|---|---|---|---|
| $2^3$ | $2^2$ | $2^1$ | $2^0$ | | |
| 0 | 0 | 0 | 0 | 0 | 1 |
| 0 | 0 | 0 | 1 | 1 | 2 |
| 0 | 0 | 1 | 0 | 2 | 3 |
| 0 | 0 | 1 | 1 | 3 | 4 |
| 0 | 1 | 0 | 0 | 4 | 5 |
| 0 | 1 | 0 | 1 | 5 | 6 |
| 0 | 1 | 1 | 0 | 6 | 7 |
| 0 | 1 | 1 | 1 | 7 | 8 |
| 1 | 0 | 0 | 0 | 8 | 9 |
| 1 | 0 | 0 | 1 | 9 | 10 |
| 1 | 0 | 1 | 0 | A | 11 |
| 1 | 0 | 1 | 1 | B | 12 |
| 1 | 1 | 0 | 0 | C | 13 |
| 1 | 1 | 0 | 1 | D | 14 |
| 1 | 1 | 1 | 0 | E | 15 |
| 1 | 1 | 1 | 1 | F | 16 |

FIG. 9

| DNR | SNR | AC | MEMORY ACCESS | NOTE |
|---|---|---|---|---|
| 0 | 0 | 0 | — | |
| 0 | 0 | 1 | — | |
| 0 | 1 | 0 | NONE | CASE 1 |
| 0 | 1 | 1 | READ $X_B$ | CASE 2 |
| 1 | 0 | 0 | NONE | CASE 3 |
| 1 | 0 | 1 | READ/WRITE*3 $X_A$ | CASE 4 |
| 1 | 1 | 0 | — | |
| 1 | 1 | 1 | — | |

\*1: 
- 1 ADDITION USING DNR OR SNR CONTENT
- 2 NO ADDING OPERATION

\*2: 
- 1 WITH CARRY
- 2 WITHOUT CARRY

\*3: WRITING OF OPERATION RESULT INTO $X_A$

CASE 4

CASE 2

FIG. 16

| $IS1_0$ | $IS1_1$ | $W_0$ | $W_1$ | $I3_0$ | $I3_1$ | $I3_2$ | $I3_3$ |
|---|---|---|---|---|---|---|---|
| 0 | 0 | 0 | 0 | I10 | F | F | F |
| 0 | 0 | 0 | 1 | I10 | I1 | F | F |
| 0 | 0 | 1 | 0 | I10 | I11 | I12 | F |
| 0 | 0 | 1 | 1 | I10 | I11 | I12 | I13 |
| 0 | 1 | 0 | 0 | I11 | F | F | F |
| 0 | 1 | 0 | 1 | I11 | I12 | F | F |
| 0 | 1 | 1 | 0 | I11 | I12 | I13 | F |
| 0 | 1 | 1 | 1 | I11 | I12 | I13 | I14 |
| 1 | 0 | 0 | 0 | I12 | F | F | F |
| 1 | 0 | 0 | 1 | I12 | I13 | F | F |
| 1 | 0 | 1 | 0 | I12 | I13 | I14 | F |
| 1 | 0 | 1 | 1 | I12 | I13 | I14 | I15 |
| 1 | 1 | 0 | 0 | I13 | F | F | F |
| 1 | 1 | 0 | 1 | I13 | I14 | F | F |
| 1 | 1 | 1 | 0 | I13 | I14 | I15 | F |
| 1 | 1 | 1 | 1 | I13 | I14 | I15 | I16 |

FIG. 17

| IS2$_0$ | IS2$_1$ | W$_0$ | W$_1$ | I4$_0$ | I4$_1$ | I4$_2$ | I4$_3$ |
|---|---|---|---|---|---|---|---|
| 0 | 0 | 0 | 0 | I2$_0$ | 0 | 0 | 0 |
| 0 | 0 | 0 | 1 | I2$_0$ | I2$_1$ | 0 | 0 |
| 0 | 0 | 1 | 0 | I2$_0$ | I2$_1$ | I2$_2$ | 0 |
| 0 | 0 | 1 | 1 | I2$_0$ | I2$_1$ | I2$_2$ | I2$_3$ |
| 0 | 1 | 0 | 0 | I2$_1$ | 0 | 0 | 0 |
| 0 | 1 | 0 | 1 | I2$_1$ | I2$_2$ | 0 | 0 |
| 0 | 1 | 1 | 0 | I2$_1$ | I2$_2$ | I2$_3$ | 0 |
| 0 | 1 | 1 | 1 | I2$_1$ | I2$_2$ | I2$_3$ | I2$_4$ |
| 1 | 0 | 0 | 0 | I2$_2$ | 0 | 0 | 0 |
| 1 | 0 | 0 | 1 | I2$_2$ | I2$_3$ | 0 | 0 |
| 1 | 0 | 1 | 0 | I2$_2$ | I2$_3$ | I2$_4$ | 0 |
| 1 | 0 | 1 | 1 | I2$_2$ | I2$_3$ | I2$_4$ | I2$_5$ |
| 1 | 1 | 0 | 0 | I2$_3$ | 0 | 0 | 0 |
| 1 | 1 | 0 | 1 | I2$_3$ | I2$_4$ | 0 | 0 |
| 1 | 1 | 1 | 0 | I2$_3$ | I2$_4$ | I2$_5$ | 0 |
| 1 | 1 | 1 | 1 | I2$_3$ | I2$_4$ | I2$_5$ | I2$_6$ |

FIG. 18

| F C | | | | F | OPERATION |
|---|---|---|---|---|---|
| 0 | 0 | 0 | 0 | 0 | L |
| 0 | 0 | 0 | 1 | 0 | H |
| 0 | 0 | 1 | 0 | 0 | A |
| 0 | 0 | 1 | 1 | 1 | $\overline{A}$ |
| 0 | 1 | 0 | 0 | 0 | A·B |
| 0 | 1 | 0 | 1 | 1 | $\overline{A}$·B |
| 0 | 1 | 1 | 0 | 0 | A+B |
| 0 | 1 | 1 | 1 | 1 | $\overline{A}$+B |
| 1 | 0 | 0 | 0 | 0 | A⊕B |
| 1 | 0 | 0 | 1 | 1 | $\overline{A⊕B}$ |
| 1 | 0 | 1 | 0 | 0 | A PLUS B |
| 1 | 0 | 1 | 1 | 1 | A PLUS B PLUS CARRY |
| 1 | 1 | 0 | 0 | 0 | A MINUS B |
| 1 | 1 | 0 | 1 | 0 | A MINUS B MINUS BORROW |
| 1 | 1 | 1 | 0 | 1 | A PLUS 1 |
| 1 | 1 | 1 | 1 | 0 | $\overline{A}$ PLUS 1 |

FIG. 19

| | R20 | R21 | R22 | R23 | R24 | R25 | R26 | R27 |
|---|---|---|---|---|---|---|---|---|
| Do | Di | Wo | Wi | | | | | |

(table data)

| Do | Di | Wo | Wi | R20 | R21 | R22 | R23 | R24 | R25 | R26 | R27 |
|---|---|---|---|---|---|---|---|---|---|---|---|
| 0 | 0 | 0 | 0 | R10 | R11 | R12 | R13 | 0 | 0 | 0 | 0 |
| 0 | 0 | 0 | 1 | R10 | R11 | R12 | R13 | 0 | 0 | 0 | 0 |
| 0 | 0 | 1 | 0 | R10 | R11 | R12 | R13 | 0 | 0 | 0 | 0 |
| 0 | 0 | 1 | 1 | R10 | R11 | R12 | R13 | 0 | 0 | 0 | 0 |
| 0 | 1 | 0 | 0 | 0 | R10 | R11 | R12 | R13 | 0 | 0 | 0 |
| 0 | 1 | 0 | 1 | 0 | R10 | R11 | R12 | R13 | 0 | 0 | 0 |
| 0 | 1 | 1 | 0 | 0 | R10 | R11 | R12 | R13 | 0 | 0 | 0 |
| 0 | 1 | 1 | 1 | 0 | R10 | R11 | R12 | R13 | 0 | 0 | 0 |
| 1 | 0 | 0 | 0 | 0 | 0 | R10 | R11 | R12 | R13 | 0 | 0 |
| 1 | 0 | 0 | 1 | 0 | 0 | R10 | R11 | R12 | R13 | 0 | 0 |
| 1 | 0 | 1 | 0 | 0 | 0 | R10 | R11 | R12 | R13 | 0 | 0 |
| 1 | 0 | 1 | 1 | 0 | 0 | R10 | R11 | R12 | R13 | 0 | 0 |
| 1 | 1 | 0 | 0 | 0 | 0 | 0 | R10 | R11 | R12 | R13 | 0 |
| 1 | 1 | 0 | 1 | 0 | 0 | 0 | R10 | R11 | R12 | R13 | 0 |
| 1 | 1 | 1 | 0 | 0 | 0 | 0 | R10 | R11 | R12 | R13 | 0 |
| 1 | 1 | 1 | 1 | 0 | 0 | 0 | R10 | R11 | R12 | R13 | 0 |

FIG. 20

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| M7 | O | O | O | O | O | O | O | O | O | O | O | O | O | O | O | O |
| M6 | O | O | O | O | O | O | O | O | O | O | O | O | O | O | O | − |
| M5 | O | O | O | O | O | O | O | O | O | O | O | − | O | O | − | − |
| M4 | O | O | O | O | O | O | O | − | O | O | − | − | O | − | − | − |
| M3 | O | O | O | − | O | O | − | − | O | − | − | − | − | − | − | − |
| M2 | O | O | − | − | O | − | − | − | − | − | − | − | O | O | O | O |
| M1 | O | − | − | − | − | − | − | − | O | O | O | O | O | O | O | O |
| M0 | − | − | − | − | O | O | O | O | O | O | O | O | O | O | O | O |
| W1 | O | − | O | − | O | − | O | − | O | − | O | − | O | − | O | − |
| W0 | O | O | − | − | O | O | − | − | O | O | − | − | O | O | − | − |
| D1 | O | O | O | O | − | − | − | − | O | O | O | O | − | − | − | − |
| D0 | O | O | O | O | O | O | O | O | − | − | − | − | − | − | − | − |

| Mi | R3i |
|----|-----|
| 0  | R3i |
| 1  | R2i |

$i = 0 \sim 7$

METHOD AND APPARATUS FOR BIT OPERATIONAL PROCESS

This is a continuation of application Ser. No. 641,064, filed Jan. 14, 1991, now U.S. Pat. No. 5,175,816 which is a continuation of application Ser. No. 779,794, filed Sep. 24, 1985, now U.S. Pat. No. 5,034,900.

BACKGROUND OF THE INVENTION

The present invention relates to a digital processing system and, particularly, to a method and apparatus for bit operational process suitably used in an image processing system having a bit-map display.

At first, we will provide a description of an example of image processing intended by the present invention, as shown in FIG. 1; and then, we will describe certain problems which result when this image processing is implemented on a conventional system, with reference to FIG. 3. Referring to FIG. 1, reference symbol M1 denotes a memory area storing image data in 1-to-1 correspondence to a CRT (Cathode Ray Tube) screen, M2 denotes a memory area storing image data to be added to the image data in M1, $X_A$ and $X_B$ denote partial areas in M1 and M2, respectively, for which image data processing takes place, $W_{A0}$, $W_{A1}$, $W_{A2}$, $W_{B0}$ and $W_{B1}$ denote boundaries of data words having a word length of 16 bits, for example, R0 thorough Rm represent raster lines for the partial areas $X_A$ and $X_B$, na and nb represent displacements of the leading edges of the areas $X_A$ and $X_B$ from the word boundaries $W_{A0}$ and $W_{B0}$, respectively $A_0$ through $A_n$ and $B_0$ through $B_n$ represent addresses of word data in the areas $X_A$ and $X_B$, and MFY denotes a modification unit implementing the alignment and processing for the areas $X_A$ and $X_B$ having different starting bit positions na and nb.

Since the currently available processing unit such as a microprocessor deals with data and makes access to the memory in units of a word or a byte, the memory areas M1 and M2 shown in FIG. 1 have a word or byte structure. However, in image processing, a partial screen area to be processed is specified from the outside of the system without regard to the word boundary as shown by areas $X_A$ and $X_B$ in FIG. 1. On this account, image processing for combining the partial areas $X_A$ and $W_B$ needs a modification unit MFY with the following three processing functions.

(1) Rearrangement of word data so that processing can take place on a word-wide basis between data for areas $X_A$ and $X_B$ with different starting bit positions na and nb.

(2) Separation of data section from word-wide data e.g., na bits, in each of addresses $A_0$, $A_3$, ..., $A_{n-2}$ so that it is retained unchanged in the processing.

(3) Data processing in any specific number of bits (bit width) so that monochrome display is implemented using one bit per pixel while color display uses a plurality of bits per pixel (generally four bits per pixel).

The operation of the modification unit having these functions will be described in connection with FIG. 2. Throughout the following description, it is assumed that the image data memory is addressed in units of a word.

FIG. 2 shows a 2-word register SRC(A) and SRC(B) for storing data read out of the processing area $X_B$, a 2-word register DST(A) and DST(B) for storing data read out of the processing area $X_A$, and a 2-word register MRG(A) and MRG(B) for storing the result of processing for the contents of the registers SRC(A,B) and DST(A,B). The modification unit MFY performs rotation of the register SRC(A,B), i.e., shift of SRC content with bit 0 of SRC(A) linked with bit F of SRC(B), depending on the values of SN (i.e., nb) and DN (i.e., na) representing the starting bit positions of the processing areas $X_A$ and $X_B$, as follows.

(a) For SN>DN: Rotate the SRC content left by a number of bits of SN-DN.

(b) For SN<DN: Rotate the SRC content right by a number of bits of DN-SN.

(c) For SN=DN: No operation.

In this way, bit addresses nb(SN) and na(DN) are used to align the operation starting bit position.

Consequently, the starting bit position of the SRC content is adjusted to that of the DST content. The bit width of processing, WN, is set in advance, and the remaining portion of data is left unchanged. Although in FIG. 2 the result of register MRG(A,B) is provided independently of DST(A,B), they may be arranged in common. After the subsequent processing, the original bit position of the SRC content is restored automatically.

Next, the 4-bit image processing for the areas $X_A$ and $X_B$ by the modification unit MFY will be described in connection with FIGS. 3, 4, 5 and 6. The process is shown in FIG. 3 includes step S1 of setting the starting address $A_0$ for the processing area $X_A$, step S2 of setting DN to the starting bit position (address) na, step S3 of setting the starting address $B_0$ for the processing area $X_B$, step S4 of setting SN to the starting bit position (address) nb, step S5 of the process implemented by the modification unit MFY mentioned above, steps S6-S9 for the area $X_B$ for obtaining the next bit address (S6), setting the next SN (S7), incrementing the address in word units (S8) and reading next word data (S9), and steps S10-S14 for the area $X_B$ for obtaining the next bit address (S10), setting the next DN (S11), writing the result of process in the register MRG(A) (S12), incrementing the address in word units (S13) and reading the next word data (S14). The process further includes decision steps SB1 and SB2, which implement the following operations.

(I) Decision step SB1

This step tests as to whether the next SN address of SRC resulting from the steps S6 and S7 as in the following expression (1) reaches beyond the word boundary as in the following expression (2), and controls the sequence to fetch the next word data when the condition (2) is met.

$$SN = SN + WN \quad (1)$$

$$SN \geq (10)_{HEX} \quad (2)$$

(II) Decision step SB2

This step tests as to whether the next DN address of DST resulting from the steps S10 and S11 reaches beyond the word boundary as in the following expression (3), and controls the sequence to write data in the register MRG(A) to the area $X_A$ when the condition (3) is met, which indicates the end of operation at the current word boundary.

$$DN \geq (10)_{HEX} \quad (3)$$

The above operations for one raster (R0) will be described in more detail in connection with FIGS. 4, 5, and 6.

FIG. 4 is the case of condition, $$DN + WN = (A)_{HEX} + (4)_{HEX}$$
$$< (10)_{HEX}$$

Then, reading of the next word data and writing of process result do not take place.

FIG. 5 is the case of condition, $$DN + WN = (E)_{HEX} + (4)_{HEX}$$
$$> (10)_{HEX}$$

Then, reading of the next word data and writing of process result take place.

FIG. 6 is the case of condition, $$SN + WN = (D)_{HEX} + (4)_{HEX}$$
$$> (10)_{HEX}$$

and $$DN + WN = (2)_{HEX} + (4)_{HEX}$$
$$< (10)_{HEX}$$

Then, reading of the next SRC word data takes place, but writing of the process result does not take place.

Attempting to implement the image processing of the present invention using a conventional system involves the following drawbacks.

(1) The conventional microprocessor of word addressing type needs register rotation and word boundary check by software in implementing bit block operations, resulting in a complex system control.

(2) Fetching of data from the processing areas $X_A$ and $X_B$ needs different access timing depending on the current bit position with respect to the word boundary, resulting in a complex software control.

(3) The amount of the data stored in the memory areas M1 and M2 will range as much as from 100 kilobytes to several mega-bytes, and the process shown in FIG. 3 with the bit width WN being set as large as one byte (8 bits) will take a total number of steps of the order of $10^6$, and therefore the number of processing steps needs to be reduced drastically.

Furthermore, the conventional microprocessor merely allows bit operations such as arithmetic shift, logical shift, bit set, bit reset, etc. in addition to On this account, in order to achieve "raster operation" on a bit-map display having a memory in correspondence at each point of on/off control to the display screen for implementing an image process between separate rectangular areas of arbitrary size on the screen, the above-mentioned bit operations do not suffice the purpose, but operations of data with any bit width at any position in each word becomes necessary. If such operations are intended to be performed using a microprocessor, input data is shifted for bit alignment, and operation is conducted on the data, the resultant data is shifted for the alignment with another data to be merged, and after the merging operation the resultant data is stored in the original memory location. These sequential operations takes too long time, and fast image processing cannot be expected.

There is a method of solving this problem, in which there is added to the system a barrel shifter that is capable of multi-bit shift at the same operating speed as the single-bit shift, and a merging circuit. However, despite the capability of bit alignment by the barrel shifter, the processor is limited to fixed word-length operations and external memory access usually in 8-bit or 16-bit length, and the restricted hardware ability for implementing arbitrary bit width operations need to be covered by complex software processes through the use of simple bit operations. An example of the processor for implementing the foregoing operations is Micro Processor, model Am 29116, manufactured by ADVANCED MICRO DEVICES.

SUMMARY OF THE INVENTION

It is an object of this invention to provide a method and apparatus for bit operation with the intention to simplify and speed up the computation between data with arbitrary number of bits at arbitrary position in each data word.

Another object of this invention is to provide a bit processing system capable of easily accessing an external data memory under word address control for the internal processing under bit address control.

Still another object of this invention is to provide a bit operation unit capable of easily executing an arithmetic and logic operation for bits with any number of bits at any position in each data word.

A further object of this invention is to provide a bit operation processing system capable of bit and word address control and external memory access control on a hardware basis so that the overhead software processing is reduced to enhance the system performance.

In order to achieve the above objectives, this invention has features as follows.

(1) Internal computations are controlled entirely on the basis of bit addressing.

(2) A bit address operation unit is provided for bit addressing control in addition to the word address operation unit for word addressing control.

(3) The bit address operation unit operates to add the current operation starting bit address to the bit width of bits to be operated.

(4) The bit address and word address operation units have an interface through the carry signal produced by the bit address operation unit.

(5) The carry signal of the bit address operation unit, when seen from the internal processing control, is an anticipation signal indicating that the current starting bit position will reach beyond the word boundary in the next operation cycle. Accordingly, the carry signal is used to trigger the external memory access for fetching word data necessary for the bit operation at the word boundary.

(6) The bit address and word address operation units, share the hardware components, but have the distinct logical functions relating through the carry signal.

(7) The bit address operation unit operates cyclically in a word period, and its output represents the relative bit address counted from each word boundary.

(8) The carry signal produced at a certain bit position of the bit address operation unit creates the boundary of words of $2^n$ bits.

(9) The bit address operation unit performs addition of a operation bit width for each register independently, allowing bit operations of arbitrary number of bits.

On the other hand, in order for the bit-map display to achieve operation between data of rectangular screen areas, i.e., raster operation, it is necessary to achieve operation between data with any bit width at any position in the data word. For the computation of data with any bit width by a fixed bit-width processor, the absent bit opositions of input data need to be filled. In simple arithmetic operations, a fixed bit width processor can deal with data with reduced number of bits by filling 0's bits in the lower absent bit positions to obtain a correct result including the carry bit. In the carry adding operation, lower absent bit positions must be filled with 1's bits to obtain a correct result. Logical operations between data are implemented for each corresponding bit separately, and the number of significant bits is arbitrary for the processor to obtain a correct result, except for the flags, which values are correct when absent bit positions are filled with 0's or 1's bits selectively. Accordingly, in carrying out an arithmetic or logic operation for data with arbitrary number of bits, input data are placed at high order bit positions of the processor, with absent bit positions being filled with 0's bits or 1's bits depending on the type of operation, thereby to obtain a completely correct result.

BRIEF DESCRIPTION OF THE DRAWINGS

FIG. 8 is a table for explaining the bit width of computation by the modification unit;

FIG. 9 is a table for explaining the relation between the carry signal produced by the bit address operation unit and the access timing;

FIG. 16 is a table showing the output function of the operand data slicing circuit 3 shown in FIG. 15;

FIG. 17 is a table showing the output function of the operating data slicing circuit 4 shown in FIG. 15;

FIG. 18 is a table listing the types of operation performed by the processing unit 5 shown in FIG. 15;

FIG. 19 is a table showing the merged data R2 shown in FIG. 15;

FIG. 20 is a table showing the writing mask data M shown in FIG. 15;

FIG. 27 is a diagram for explaining the operation of the bit processing system of the case with displaced bit positions.

DESCRIPTION OF THE PREFERRED EMBODIMENT

Figure 24:
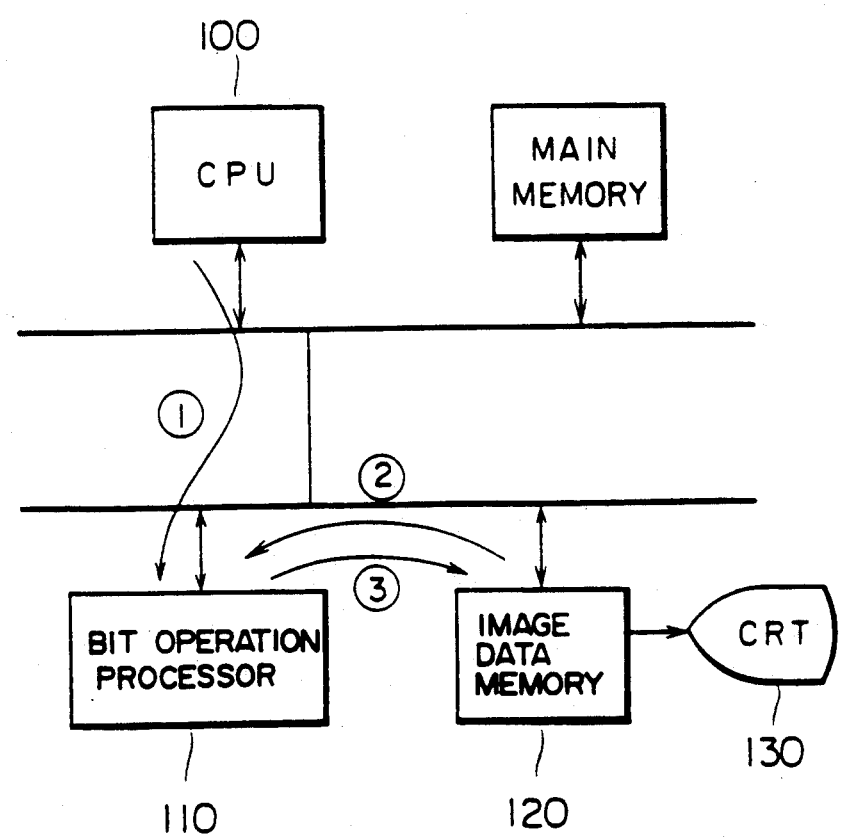
FIG. 24 is a block diagram showing the system configuration for implementing the image processing according to this invention.

In FIG. 24 showing the image processing system, the bit operation processor 110 is controlled by CPU 100 of the host computer to perform image processing such as expansion, reduction, rotation and merging of image patterns, (①). In implementing the image processing, the bit operation processor 110 fetches data from the image data memory 120, processes the data, (②), and stores the resultant data in the image data memory 120 so that it is displayed on the CRT display unit 130, (③).

This invention is intended to provide means for implementing the above-mentioned operations (②, ③) of reading and writing the image data memory 120 for data of any bit width at any positions in the data word.

Figure 7:
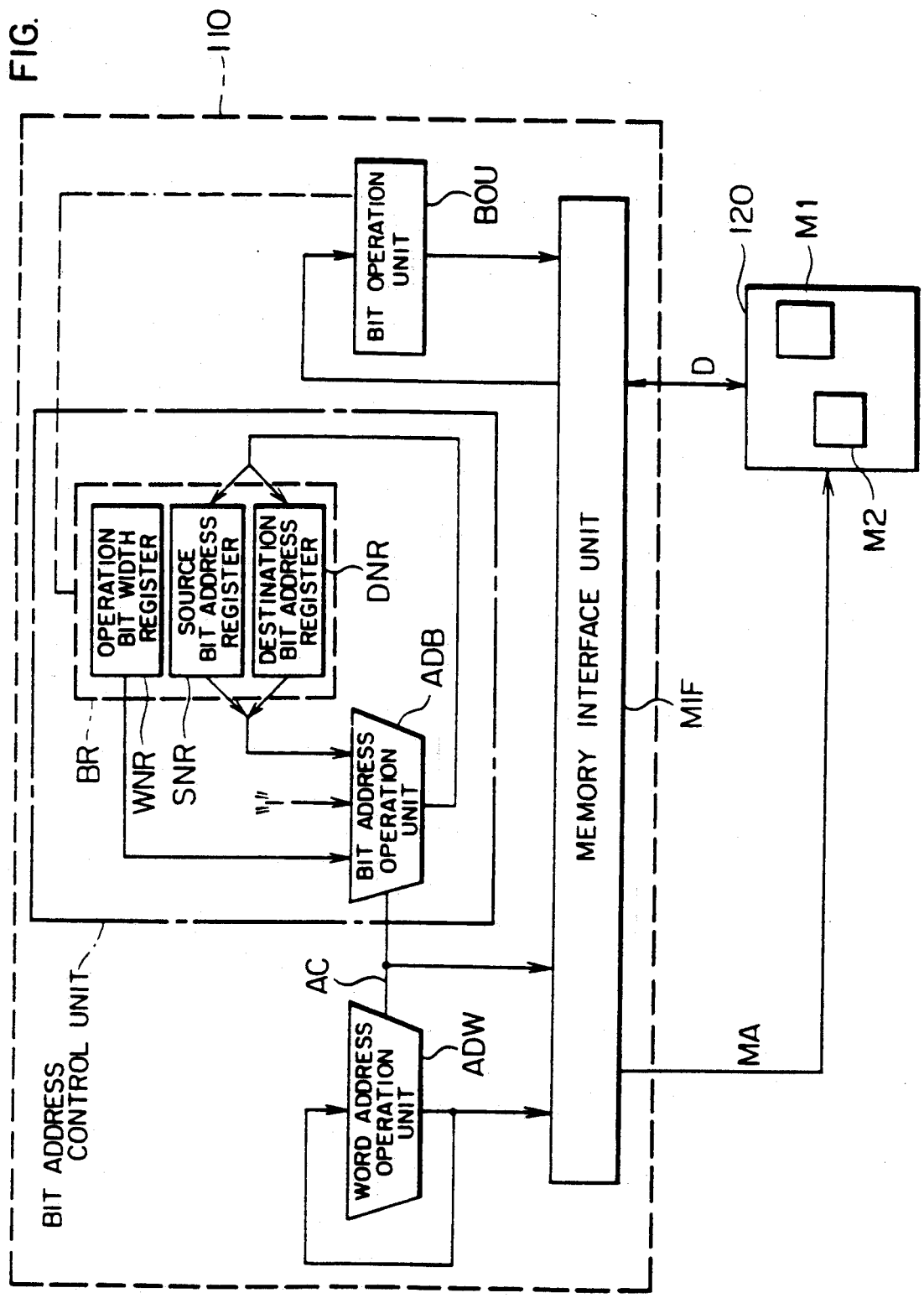
FIG. 7 is a block diagram showing the bit data processing system embodying the present invention.

First, bit position control necessary for bit operation will be described with reference to FIG. 7 showing an embodiment of the inventive bit operation processor.

The arrangement of FIG. 7 includes a word address operation unit ADW, a bit operation unit BOU for transacting data with the aforementioned memory areas M1 and M2 in the image data memory 120, a bit operation unit BOU performing the aforementioned three functions (1), (2) and (3) by rotating the register contents depending on the bit addresses SN and DN of the processing areas $X_A$ and $X_B$, a bit address operation unit ADB, and a bit register unit BR including an operation bit width register WNR for storing the value of operation bit width WN, a source bit address register SNR for storing the operation starting bit position SN for the processing area $X_B$ and a destination bit register DNR for storing the operation starting bit position DN for the processing area $X_A$. Signal line AC is for the carry produced by the bit address operation unit ADB, signal bus MA is for the word address produced by the word address operation unit ADW, and signal bus D is for word data, through which buses image data is transacted with the memory areas M1 and M2. The bit register unit BR and the bit address operation unit ADB in combination constitute a bit address control unit BM. The contents of the bit register unit BR, i.e., WN, SN and DN, are used by the bit operation unit BOU.

The bit operation unit 110 fetches date from separate memory areas M1 and M2 within the image data memory 120 via the memory interface unit MIF. There are two cases of reading the memory areas M1 and M2 depending on the starting bit position na (nb) of a data segment with a bit width WN to be processed currently in a data word with a bit width of L as follows.

(a) New word data is required for the subsequent operation, in case, $$\frac{na + Wn}{L} \geq 1, \quad \frac{nb + WN}{L} \geq 1$$

(b) Current word data sufficies for the subsequent operation, in case, $$\frac{na + WN}{L} < 1, \quad \frac{nb + WN}{L} < 1$$

The above conditions are tested on a hardware basis through the provision of an L-bit bit address operation unit ADB for adding values na (nb) and WN, with the decision being made depending on the presence or absence of the carry signal AC from the operation unit ADB. The carry signal AC indicates the need of next word data reading, and it is used to trigger the word address operation unit ADW for addressing the next data word. In this way, the bit operation unit 110 makes access to the memory areas M1 and M2 only when new word data becomes necessary for processing.

In describing operation unit 110, the operation of the bit address control unit BM will first be explained.

The bit address control unit BM operates on the bit address operation unit ADB to add a starting bit address SN (DN) in the register SNR (DNR) to a operation bit width WN in the register WNR to evaluate the starting bit address SN (DN) for the next operation, and stores the result in the register SNR (DNR).

Generally, image processing is conducted between image data in two separate screen areas, and therefore both corresponding memory areas $X_A$ and $X_B$ under process have distinct starting bit addresses which need to be stored separately, DN in DNR and SN in SNR. The operation bit width WN is constant during the entire process and common to both processing areas $X_A$ and $X_B$, and it is stored in the single register WNR.

The bit address operation unit ADB is of four bits as mentioned previously, providing a result in the range of $(0)_{HEX}$ to $(F)_{HEX}$. Accordingly, the output of the bit address operation unit ADB represents the bit position between contiguous word boundaries. However, the operation bit width WN used by the bit operation unit BOU requires bit range including $(10)_{HEX}$ beyond the word boundary in addition to $(1)_{HEX}$ to $(F)_{HEX}$. On this account, the bit operation unit BOU is designed to interpret the operation bit width WN as shown by the table of FIG. 8. In this way, the bit address control unit BM calculates the relative bit address within a 16-bit data word.

The word address operation unit ADW operates to increment the word address in response to a signal from the bit address control unit BM. The following describes the interface between the ADW and the bit address operation unit ADB in BM for the word addressing operation. The word address operation unit ADW is notified by the ADB of the overrun of the word boundary by use of the carry signal AC produced by the ADB. However, the value which any of the bit address operation unit ADB and registers WNR, SNR and DNR, which have a capacity of four bits is $(0)_{HEX}$ to $(F)_{HEX}$, therefore, addition of WN and SN (or DN) does not always produce the carry signal AC to meet the purpose. For example, in case of $WN=(F)_{HEX}$, $SN=(0)_{HEX}$ for the 16-bit operation (see FIG. 8), the following bit address calculation does not create the carry signal AC despite the case that the bit address width reach beyond the word boundary in the next operation.

$$WN+SN=(F)_{HEX}+(0)_{HEX}=(F)_{HEX}$$

On this account, the address increment operation by the bit address operation unit ADB must include addition of one so that the carry signal AC is produced as desired, as follows.

$$(WN+1)+SN=(F)_{HEX}+(1)_{HEX}+(0)_{HEX}=(10)_{HEX} \quad (4)$$

As mentioned above, a necessary carry signal AC can be produced by adding "1", and addition of "1" becomes indispensable.

The aforementioned carry signal AC can be used as a decision signal indicating as to whether or not the bit position will reach beyond the current word boundary in the next operation cycle. Accordingly, the carry signal AC from the bit address operation unit ADB can be used as, (1) an anticipation signal indicating the need of fetching the next word data, and (2) a trigger signal to the word address operation unit ADW for generating the address of word data to be fetched. In other words, the carry signal AC from the bit address operation unit ADB can be used for timing the access operation of the memory interface unit MIF to the processing areas $X_A$ and $X_B$, as shown in FIG. 9. Due to separate registers SNR and DNR for storing the starting bit addresses SN and DN, the above-mentioned functions (1) and (2) of the carry signal AC can reflect on the processing areas $X_A$ and $X_B$ independently.

Figure 1:
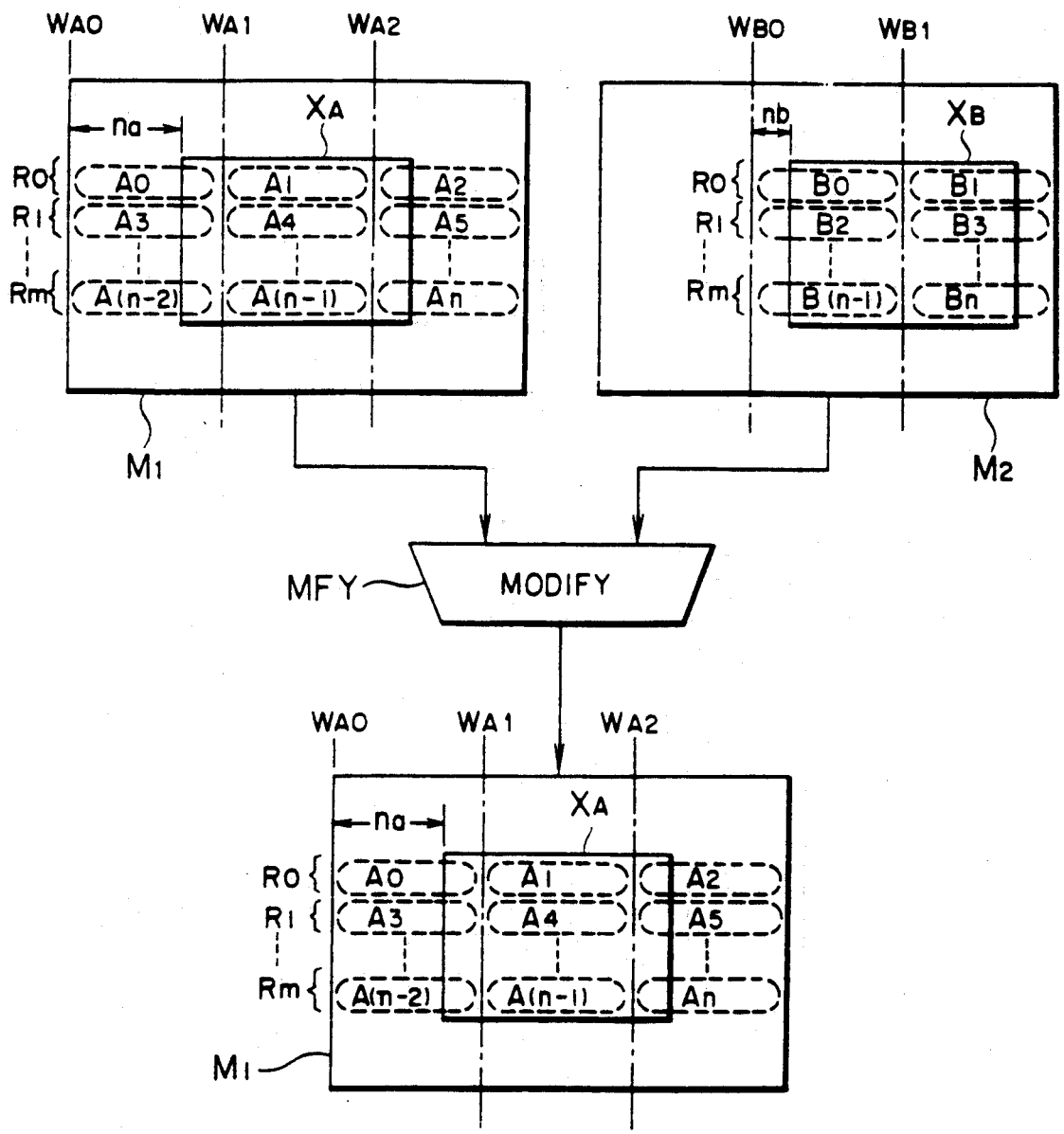
FIG. 1 is a diagram for explaining the image data processing intended by the present invention.
Figure 2:
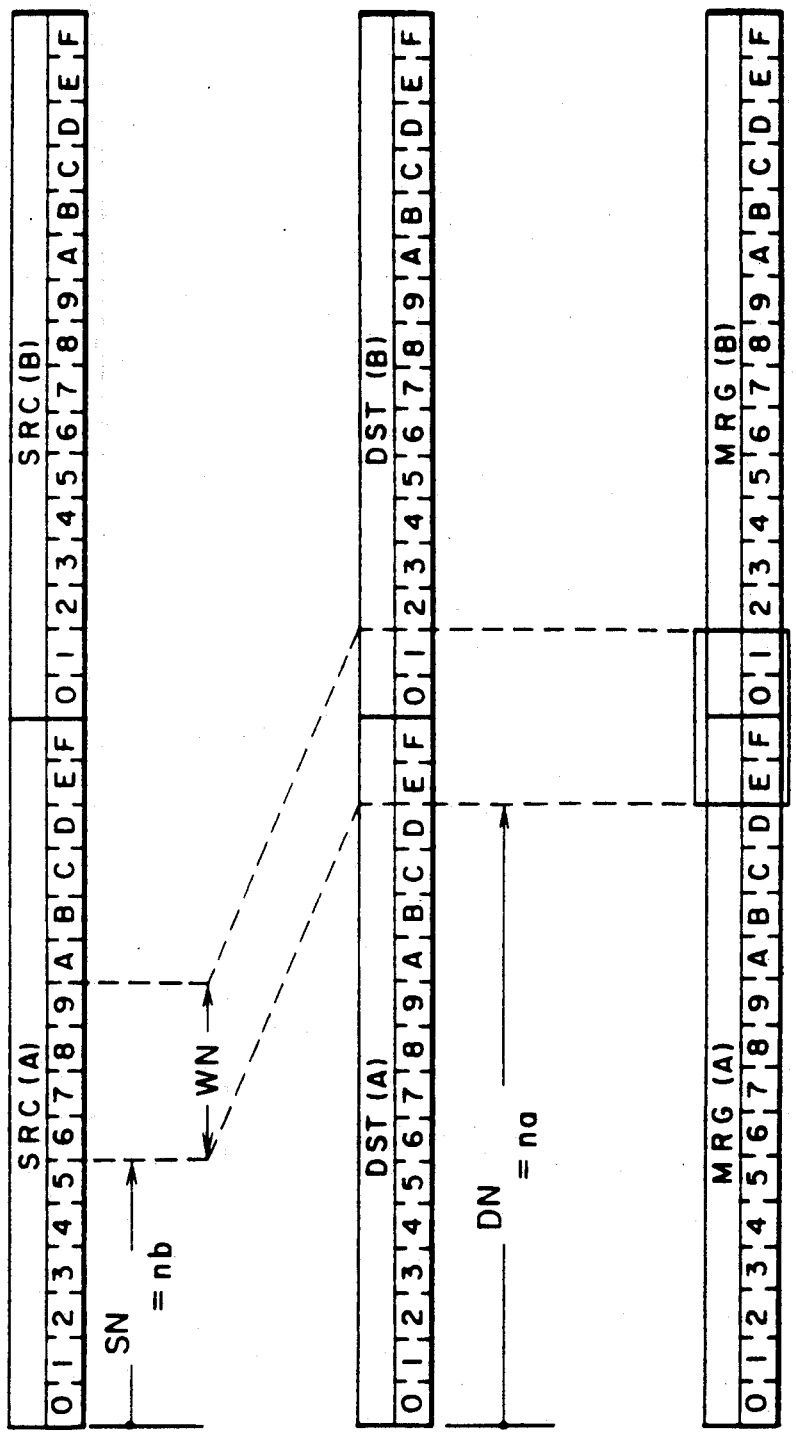
FIG. 2 is a diagram for explaining the operation of the modification unit (MFY) shown in FIG. 1.
Figure 10:
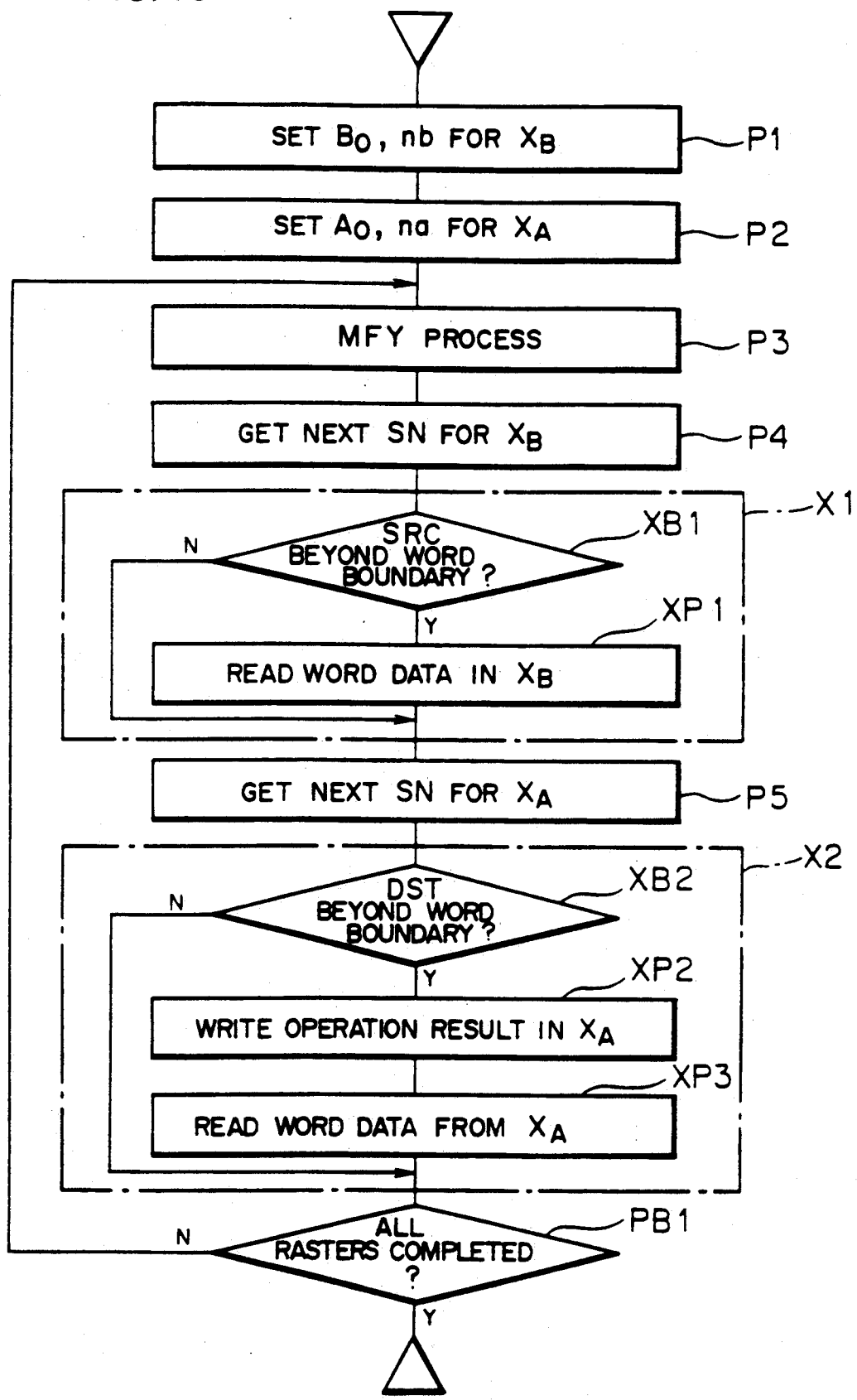
FIG. 10 is a flowchart showing the image processing operation carried out by application of this invention.

FIG. 10 shows in flowchart the operation of the foregoing embodiment of this invention applied to the image processing system shown in FIG. 1. In a sequence of operations, a processing step P1 sets the word address $B_0$ and bit address nb (SN=nb) of SNR for the operation starting bit position for the processing area $X_B$, step P2 sets the word address $A_0$ and bit address na (DN=na) of DNR for the operation starting bit position for the processing area $X_A$, step P3 is the function of the bit operation unit BOU, step P4 calculates the next operation starting bit position SN for the processing area $X_B$ using the bit address operation unit ADB and word address operation unit ADW, step P5 similarly calculates the next operation starting bit position DN for the processing area $X_A$, step XP1 reads a word data in the processing area $X_B$, step XP2 writes the operation result in the processing area $X_A$, step XP3 reads a word data in the processing area $X_A$, step PB1 tests the completion of process for each of rasters Ro-Rm, and steps XB1 and XB2 test the results of executions in the above steps XP1, XP2 and XP3 in accordance with the presence or absence of the carry signal AC.

The decision steps XB1 and XB2 will be explained in more detail in the following.

(1) It is tested as to whether the data segment to be processed next ranges within the current data word or beyond the word boundary.

(2) At the decision step XB1, if the segment is within the current data word (case 1 in FIG. 9), the step XP1 is skipped, or if the segment reaches beyond the word boundary (case 2 in FIG. 9), the step XP1 is executed to read the next word data from the processing area $X_B$.

(3) At the decision step XB2, if the segment is within the current word (case 3 in FIG. 9), the steps XP2 and XP3 are skipped, or if the segment reaches beyond the word boundary (case 4 in FIG. 9), the step XP3 is executed to read the next word data from the processing area $X_A$.

(4) In case 4, the processing step XP2 for writing the processing area $X_A$ is executed by the following reason. The processing area $X_A$ is included in the memory area M1 as shown in FIG. 1, and it is also written the result of processing. When the next starting bit position calculated basing on the value of DN reaches beyond the word boundary, it indicates that the operation for one word data has completed.

Namely, the conventional system tests the word boundary condition for fetching the next word data on a software basis, whereas the inventive system employs a bit address operation unit ADB for anticipating the need of memory access, allowing the continuous execution of the internal bit operational process while dealing with external word data.

Figure 11:
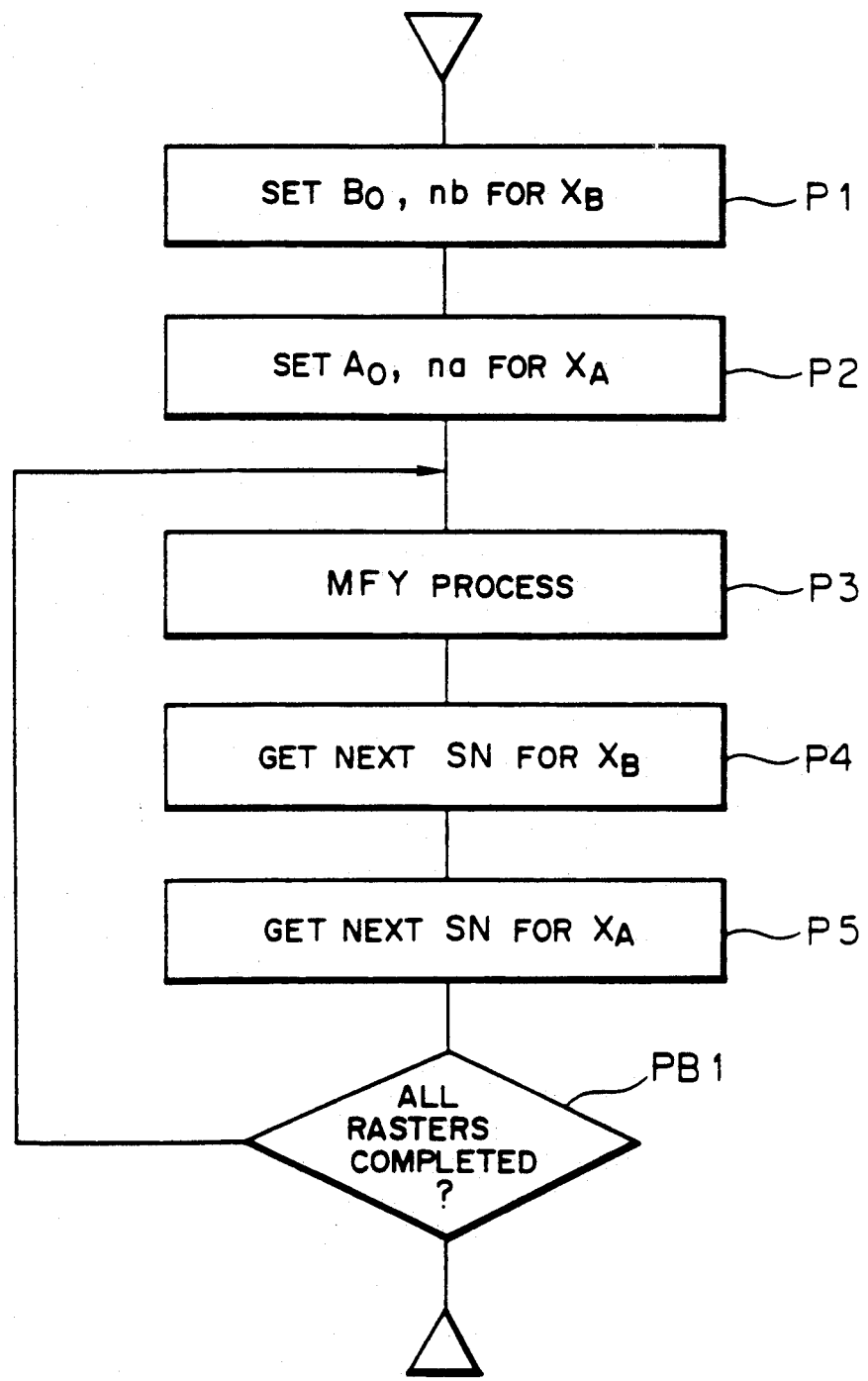
FIG. 11 is a flowchart showing part of the process of FIG. 10 conducted by the memory interface unit (MIF)

Decisions made by the steps XB1 and XB2 are based on the carry signal AC produced by the bit address operation unit ADB as described above, and the carry signal AC can readily be distinguished among the four cases shown in FIG. 9 depending on the use of register DNR or SNR. Accordingly, by implementing the decision process for the four cases as shown in FIG. 11 in the memory interface unit MIF, a processing step group X1 including the steps XB1 and XP1, and a processing step group X2 including the steps XB2, XP2 and XP3, shown in FIG. 10, can be eliminated. In FIG. 11, steps P1-P5 and PB1 are identical to those shown in FIG. 10.

Figure 12:
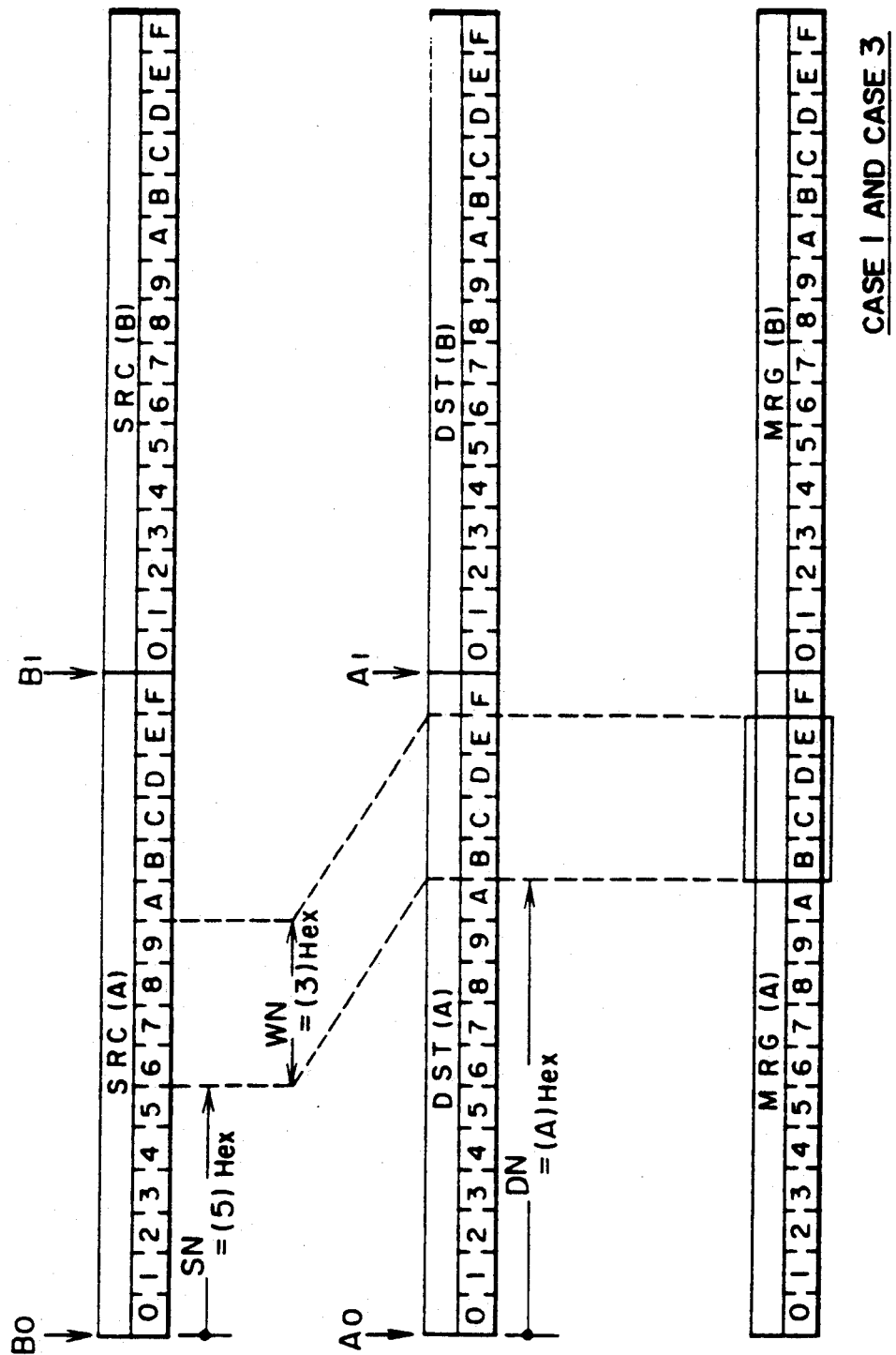
FIGS. 12, 13 and 14 are diagrams for explaining the operations shown in FIGS. 10 and 11.
Figure 13:
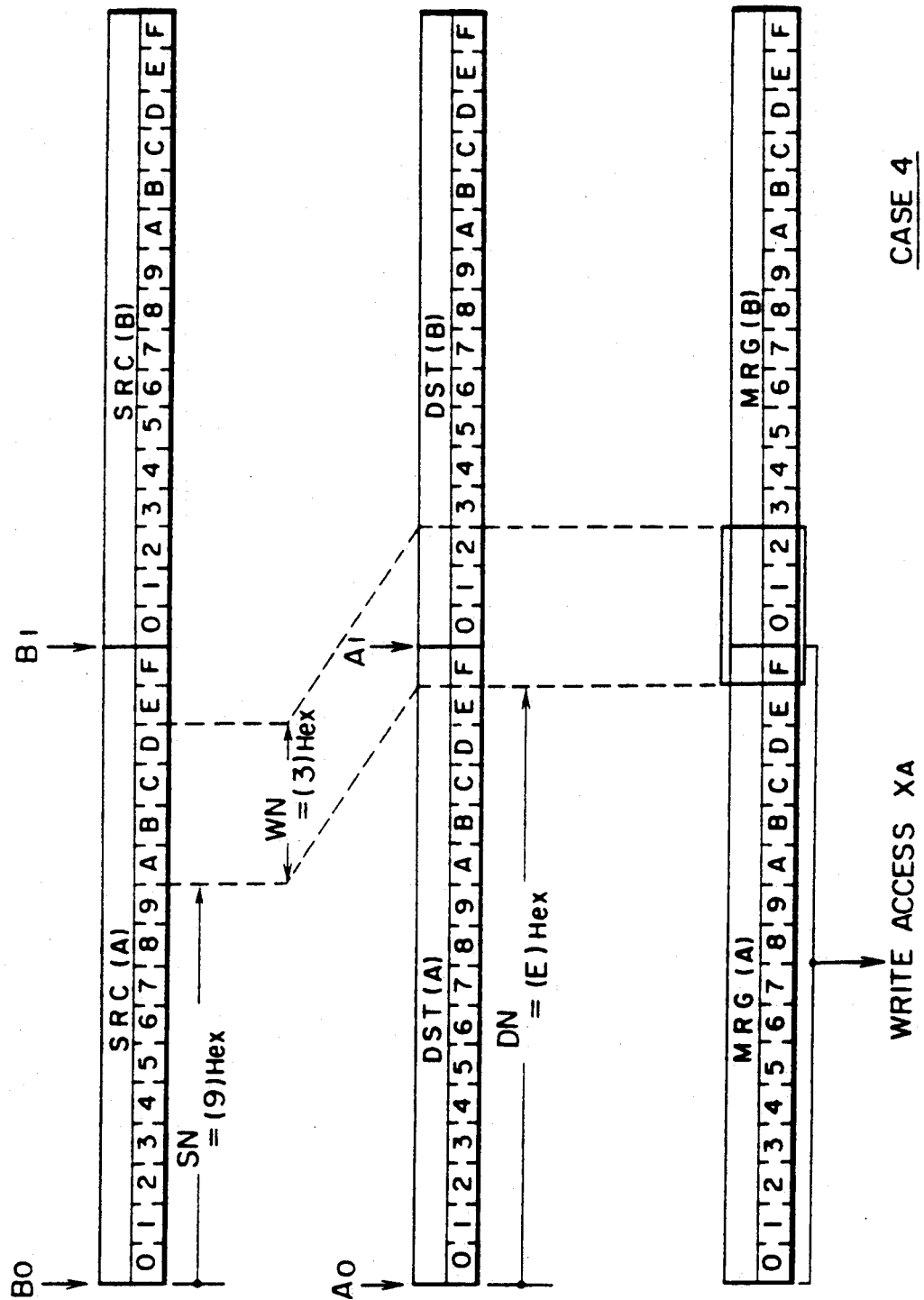
Figure 14:
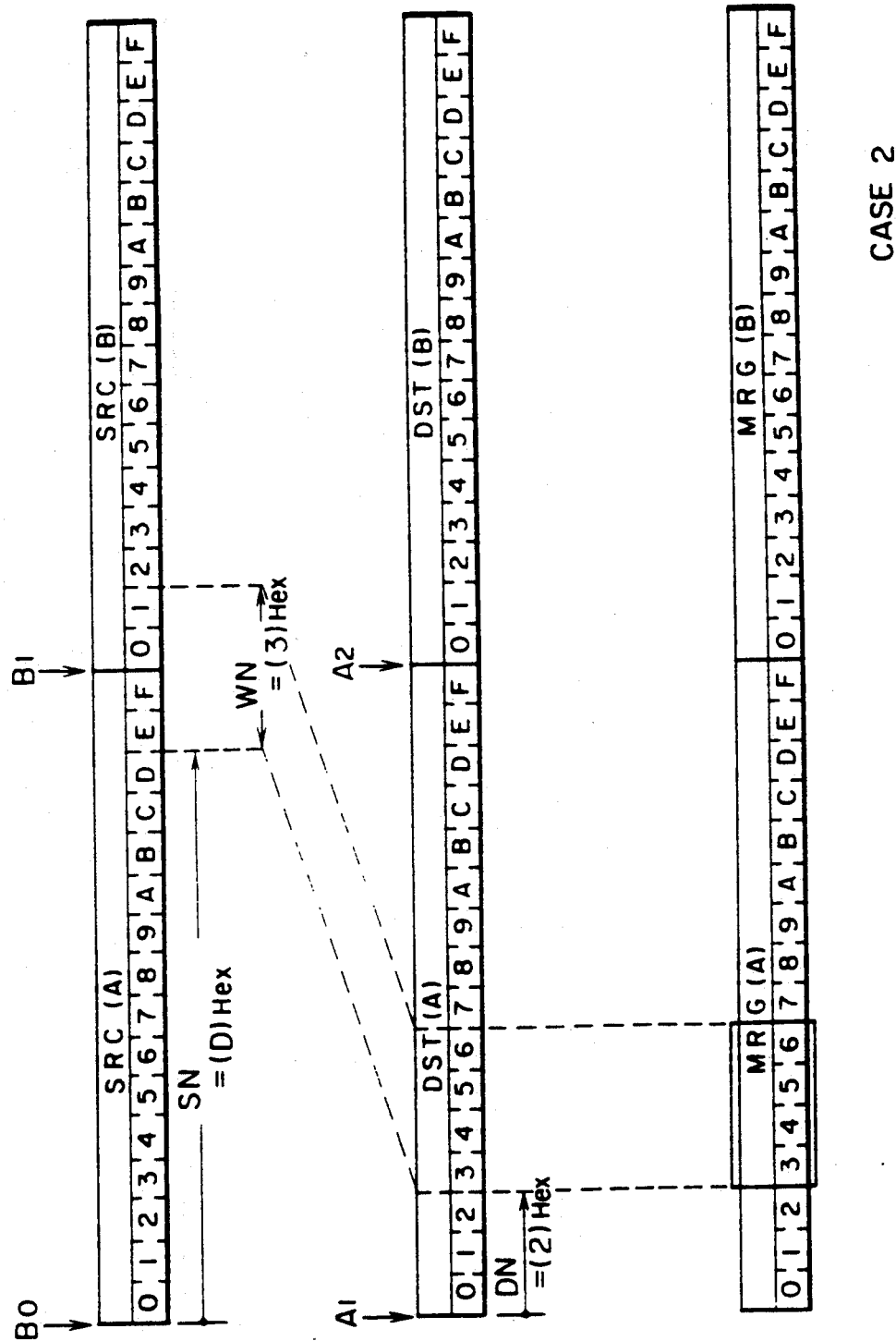

The foregoing operations of four cases are shown in FIGS. 12, 13 and 14, in which initial values are set as: the operation starting bit address $SN=(5)_{HEX}$ and word address Bo for the processing area $X_B$; the operation starting bit address $DN=(A)_{HEX}$ and word address Ao for the processing area $X_A$; the operation bit width $WN=(3)_{HEX}$. FIG. 12 is for cases 1 and 3, FIG. 13 is for case 4, and FIG. 14 is for case 2 in FIG. 9.

Next, an embodiment of this invention with the intention of fast data processing between rectangular areas on the bit-map display, i.e., raster operation, will be described in connection with FIGS. 15 through 23.

Figure 15:
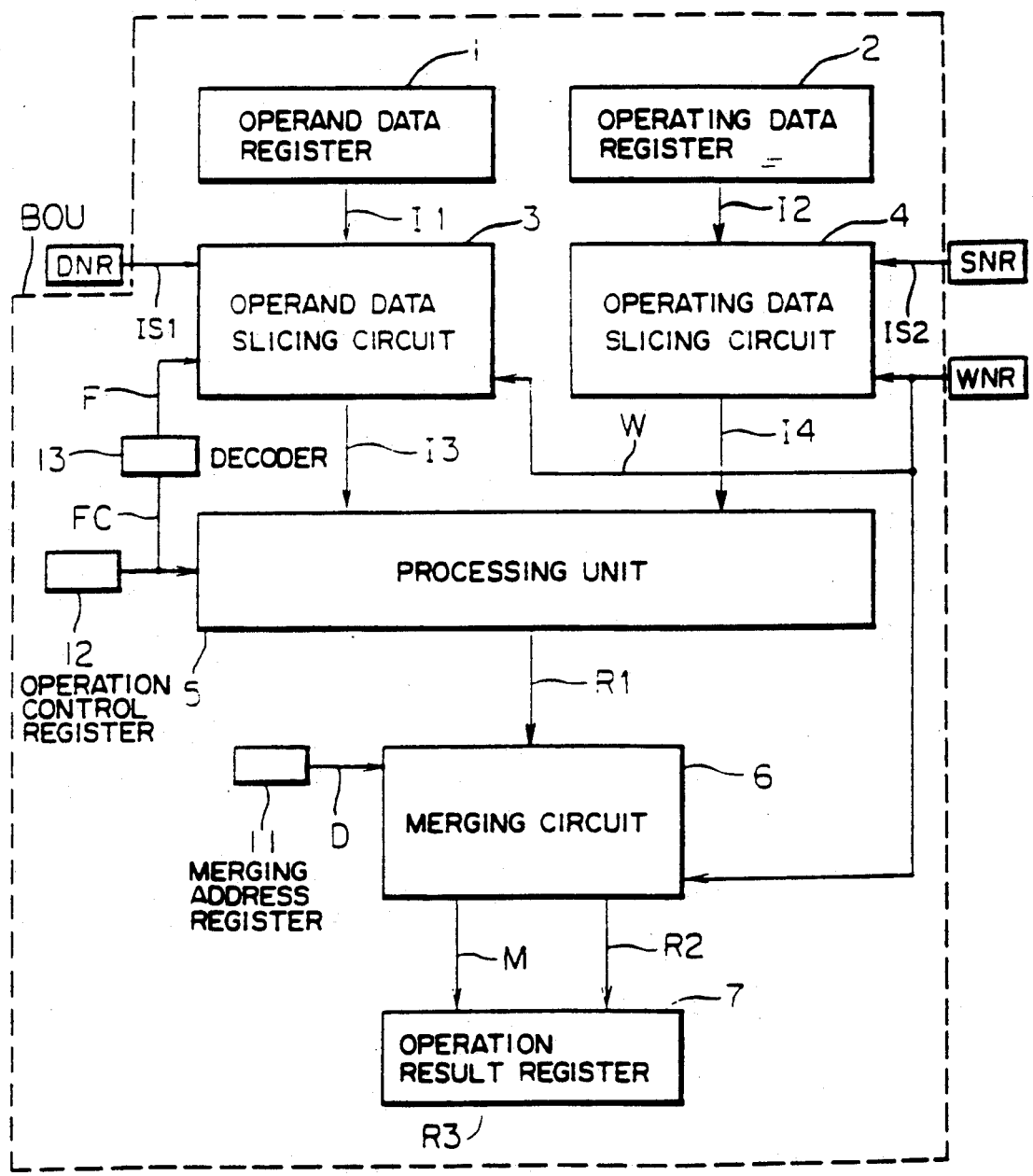
FIG. 15 is a block diagram showing in detail the arrangement of the bit operation unit shown in FIG. 7.

In FIG. 15 showing in detail the bit operation unit BOU in the bit operation processor of FIG. 7, the arrangement includes an operand data register 1, an operating data register 2, an operand data slicing circuit 3, an operating data slicing circuit 4, a processing unit 5, a data merging circuit 6, an operation result register 7, a source bit address register SNR, a destination bit address register DNR an operation bit width register WNR, a merging address register 11, an operation control register 12, and an operation command decoder 13. In this specification, term "operating data" is used to mean one member of an arithmetic/logic operation, such as X in $Z=X+Y$, while term "operand data" to mean another member of the operation, such as Y in $Z=X+Y$. The block diagram further indicates operand data I1, operating data I2, sliced operand data I3, sliced operating data I4, operand data slicing address IS1, operating data slicing address IS2, slicing bit width W, operation result R1, merging address D, writing mask data M, merged data R2, stored result data R3, operation command code FC, and operation decode data F. Data transfer to the registers 1, 2 and 7 is conducted by making access to the image data memory 120 through the memory interface unit MIF as shown in FIG. 7.

For the simplicity of the following description on the operation of the above arrangement, the processing unit 5 is assumed to have 4 bits in relation to operand data I1, operating data I2, mask data M and merged data R2 each having 8 bits, twice the operation bit width, sliced operand data I3, sliced operating data I4 and computation result R1 each having 4 bits, identical to the operation bit width, and operand data slicing address IS1, operating data slicing address IS2, slicing bit width W and merging address D each having 2 bits, derived from the 2-bit processing unit 5.

FIG. 16 is the output function table for the operand data slicing circuit 3. In the table, $IS1_0$ and $IS1_1$ are the high-order bit and low-order bit of the operand data slicing address IS1, $W_0$ and $W_1$ are the high-order bit and low-order bit of the slicing bit width W, $I3_0$-$I3_3$ are 4-bit sliced operand data ($I3_0$ being highest bit, $I3_3$ lowest), $I1_0$-$I1_7$ are 8-bit operand data ($I1_0$ being highest bit, $I1_7$ lowest), and F is the operation decode data. The operand data slicing circuit 3 produces 'F' at $I3_1$-$I3_3$ when W equals to 0 ($W_0=0$, $W_1=0$), produces 'F' at $I3_2$ and $I3_3$ when W equals to 1 ($W_0=0$, $W_1=1$), produces 'F' at $I3_3$ when W equals to 2 ($W_0=1$, $W_1=0$), and produces an effective data at $I3_0$-$I3_3$ when W equals to 3 ($W_0=1$, $W_1=1$).

Namely, the slicing bit width W is actually added by one (W+1), so that the circuit performs slicing of data ranging from 1 bit to 4 bits. The operand slicing address IS1 specifies the highest order bit $I1_0$ through W+1th bit of operand data I1 when IS1 equals to 0 ($IS1_0=0$, $IS1_1=0$), specifies the second bit I1 through W+1th bit of operand data I1 when it is equal to 1 ($IS1_0=0$, $IS1_1=1$), specifies the third bit $I1_2$ and fourth bit $I1_3$ when IS1 equals to 2, and specified the fourth bit $I1_3$ for slicing when IS1 equals to 3.

FIG. 17 is the output function table for the operating data slicing circuit 4, which operates identically to the operand data slicing circuit 3 with its input and output signals IS1, I1 and I3 being replaced with IS2, I2 and I4.

FIG. 18 a table of operation command codes FC, operation decode data F and types of operations. In the table, symbol A represents an operand data, B represents an operating data, "+" signifies logical sum, "." signifies logical product, "−" signifies negation, "+" signifies exclusive logical sum, "plus" signifies arithmetic addition, "minus" signifies arithmetic subtraction, "carry" represents the value of carry flag, and "borrow" represents the value of borrow flag.

FIGS. 19 and 20 are the output function tables for the merging circuit 6, showing merged data R2 and writing mask data M, respectively. Each signal is suffixed to indicate bit positions in the same way as for the signals in FIGS. 16 and 17. The merged data R2 is not dependent on the slicing bit width W, but is a function of the merging address D and operation result R1. With D being equal to 0, the merged data R2 is given at bit positions $R2_0$-$R2_3$ a 4-bit operation result $R1_0$-$R1_3$; at D=1, $R2_1$-$R2_4$ are given the operation result; at D=2, $R2_2$-$R2_5$ are given the operation result; and at D=3, $R2_3$-$R2_6$ are given the operation result. The remaining bit positions of the merged data R2 are filled with "0".

Writing mask data M is a function of merging address D and slicing bit width W, as shown in the table of FIG. 20. With the slicing bit width W being 0, writing mask data M has "1" at one bit position and "0" at remaining bit positions. With W=1, data M has "1" at two contiguous bit positions and "0" at remaining bit positions. With W=2, data M has "1" at three consequtive bit positions, and with W=3, data M has "1" at four consequtive bit positions and "0" at remaining bit positions. Bit positions of writing mask data having "1" are determined from the merging address D, i.e., with D=0, W+1 bits from $M_0$ becomes "1"; with D=1, W+1 bits from $M_1$ becomes "1"; with D=2, W+1 bits from $M_2$ become "1"; and with D=3, W+1 bits from $M_3$ become "1", with remaining bit positions becoming "0".

Figures 21, 22:
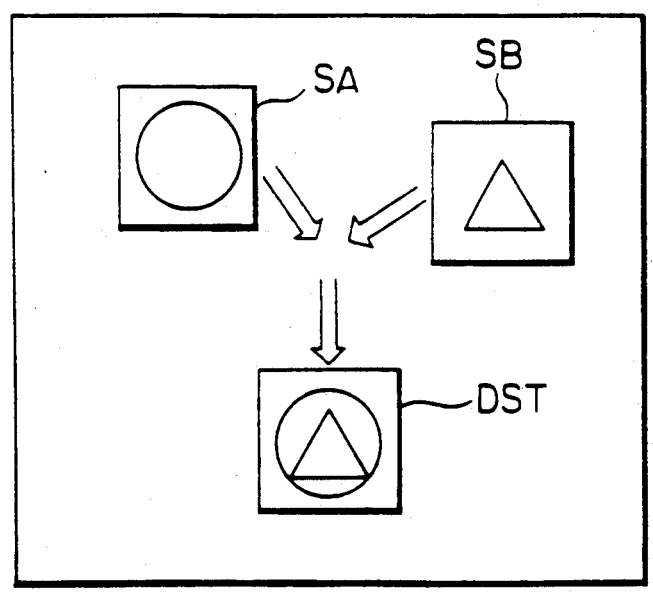
FIG. 21 is a table showing the output function of the operation result register 7 shown in FIG. 15.
FIG. 22 is an illustration showing the execution of reaster operation on the bit-map display.

FIG. 21 shows the output function table for the operation result register 7. The 8-bit register 7 provides outputs as a function of merged data R2 and writing mask data M. With bit i of writing mask data M being "0", i.e., Mi=0. bit i of stored data R3, i.e., R3$_i$, is unchanged, while with Mi being "1", the R3$_i$ is overwritten by bit i of merged data R2, i.e., R2i, where i takes an arbitrary value ranging 0 through 7.

Figure 23:
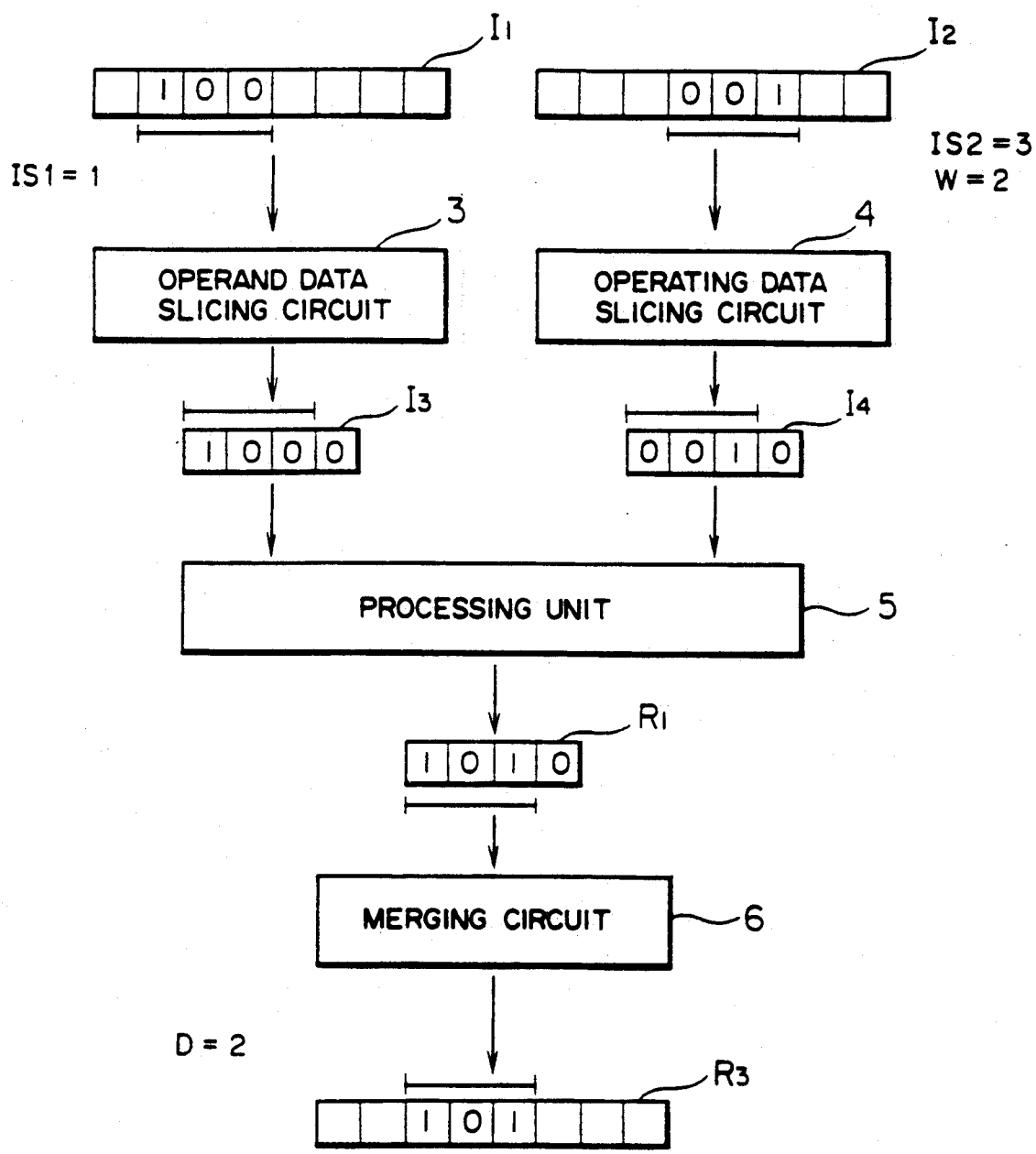

FIG. 22 illustrates the execution of raster operation on the bit-map display, in which a pair of image data in rectangular areas SA and SB are processed to obtain the result in a rectangular area DST. The bit-map display has a memory which is arranged in the 8-bit or 16-bit word length for reading and writing as in the usual memory. The rectangular data areas SA, SB and DST correspond to bit blocks of memory regardless of word boundaries. Slicing of a bit block within a word or beyond a word is treated by the bit operation processor which operates as shown in FIG. 23.

In this embodiment of the bit operation processor, the operation will be described with the following assumption of settings. The operand data I1 has a starting bit position of IS1=1, operating data I2 has IS2=3, and operation bit width W is 2 bits. The operand data I1 has value '100' on bits 1-3, and operating data I2 has value '001' on bits 3-5.

The operand data slicing circuit 3 responds to the values IS1=1 and W=2 to slice three bits ('100') from the operand data I1, and adds "0" following the lowest bit position to form sliced operand data I3. In the same way, the operating data slicing circuit 4 produces sliced operating data I4. The processing unit 5 performs operation between the sliced data I3 and I4, and provides the result R1. In the example of FIG. 23, the processing unit 5 is instructed to execute logical summation for the given data. The merging circuit 6 responds to the values of W and D to merge the high-order 3 bits ('101') of the operation result R1 into 3 bits of the stored data R3 starting at bit 3. By the above operations, operand data I1 and operating data I2 are sliced and, after operation between the data, the result is merged into the stored data R3.

Although logical summation has been explained in the above embodiment, other logical operations such as negation (NOT) and logical multiplication (AND) can obviously be executed. For arithmetic operations, when the bit width of operating data is smaller than the operation bit width (4 bits) of the processing unit 5 as in the case of FIG. 23, lower bit(s) are filled with "0". Arithmetic operations between zeros results in zero without the occurrence of the carry or borrow and does not affect the operation result of high-order bits, and therefore arithmetic operations with less number of bits can be executed. For addition of carry, the operation decode data F becomes 1, and the occurrence of carry is propagated up to the effective bit position, at which the carry bit is added.

Although in the above embodiment the operation decode data F is used only for the sliced operand data IS3, other operation decode data may be used for the sliced operating data IS4 to carry out the execution identically.

As described above, the present invention is effective in controlling the bit position of data for bit operation, as follows.

(1) By addition of a bit address operation unit ADB to the conventional word address operation unit ADW, control of operation between data with different starting bit positions SN and DN in each word data can be simplified.

(2) By using the carry signal AC of the bit address operation unit ADB for incrementing the word address operation unit ADB and by providing registers SNR and DNR separately, the word data memory areas X$_A$ and X$_B$ can readily be accessed independently of the internal bit processing.

Figure 3:
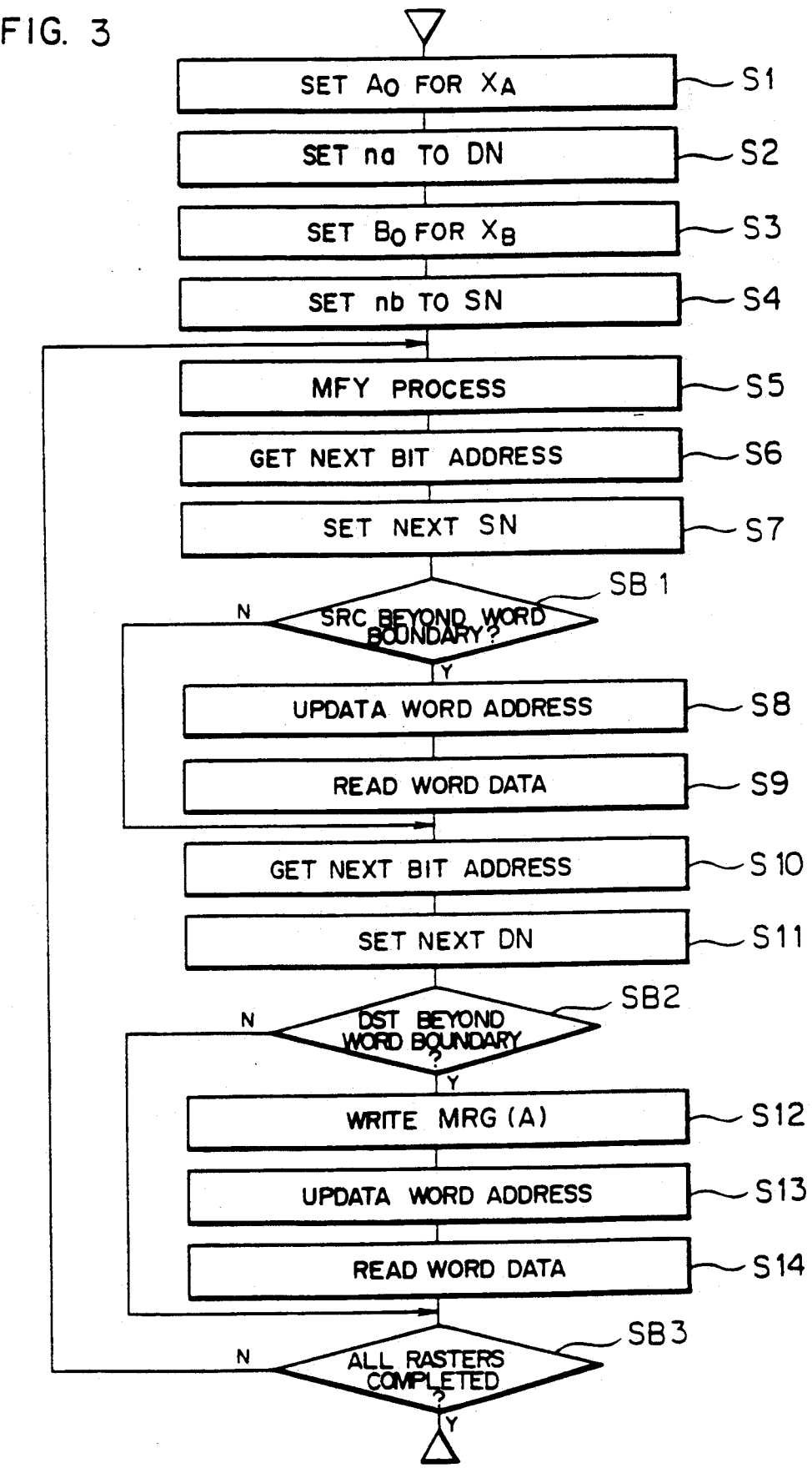
FIG. 3 is a flowchart showing the operational procedure of the modification unit when the image processing of the present invention, as explained with reference to FIG. 1, is implemented in the conventional system.
Figure 4:
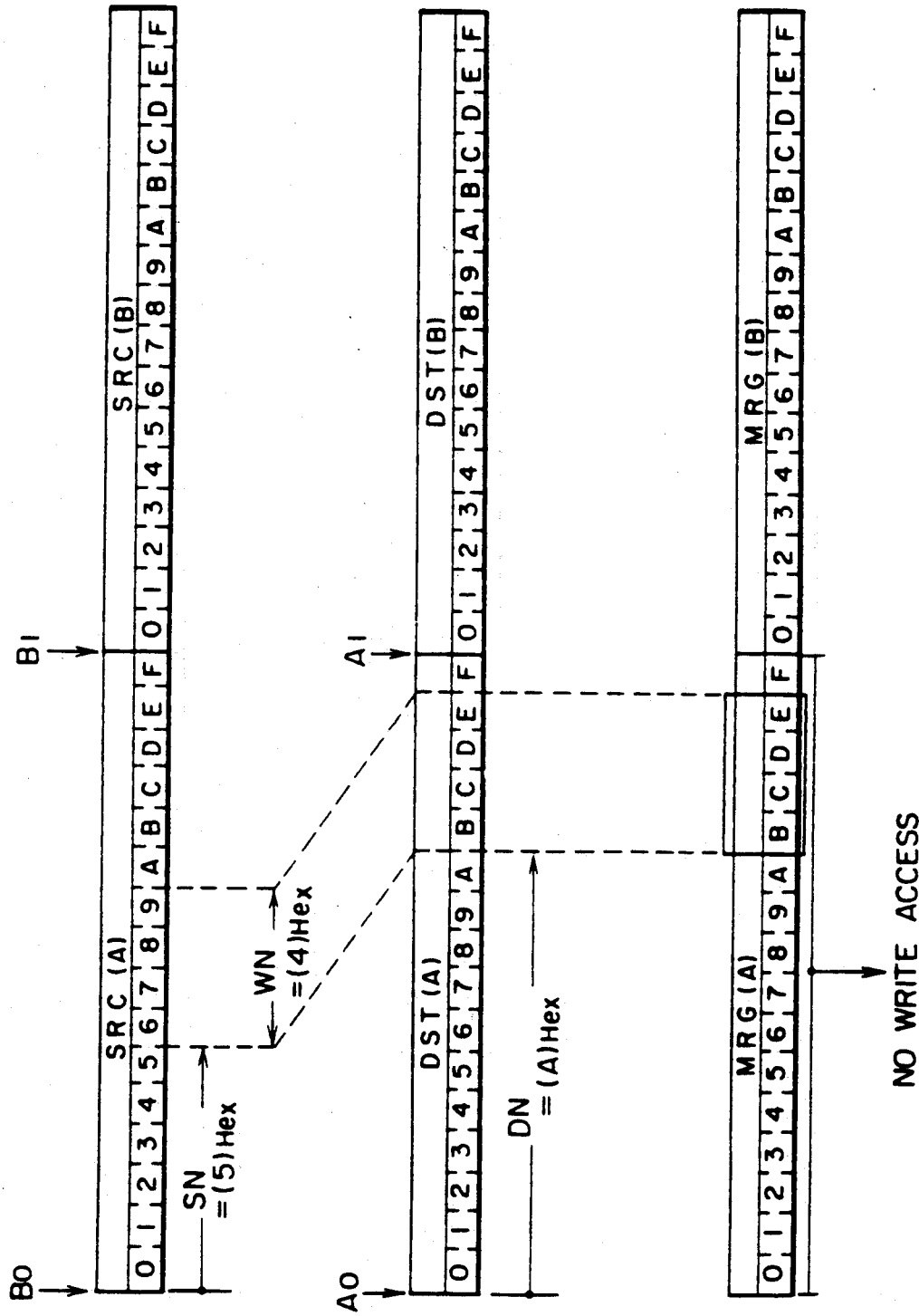
FIGS. 4, 5 and 6 are diagrams for explaining the operation shown by the flowchart of FIG. 3.
Figure 5:
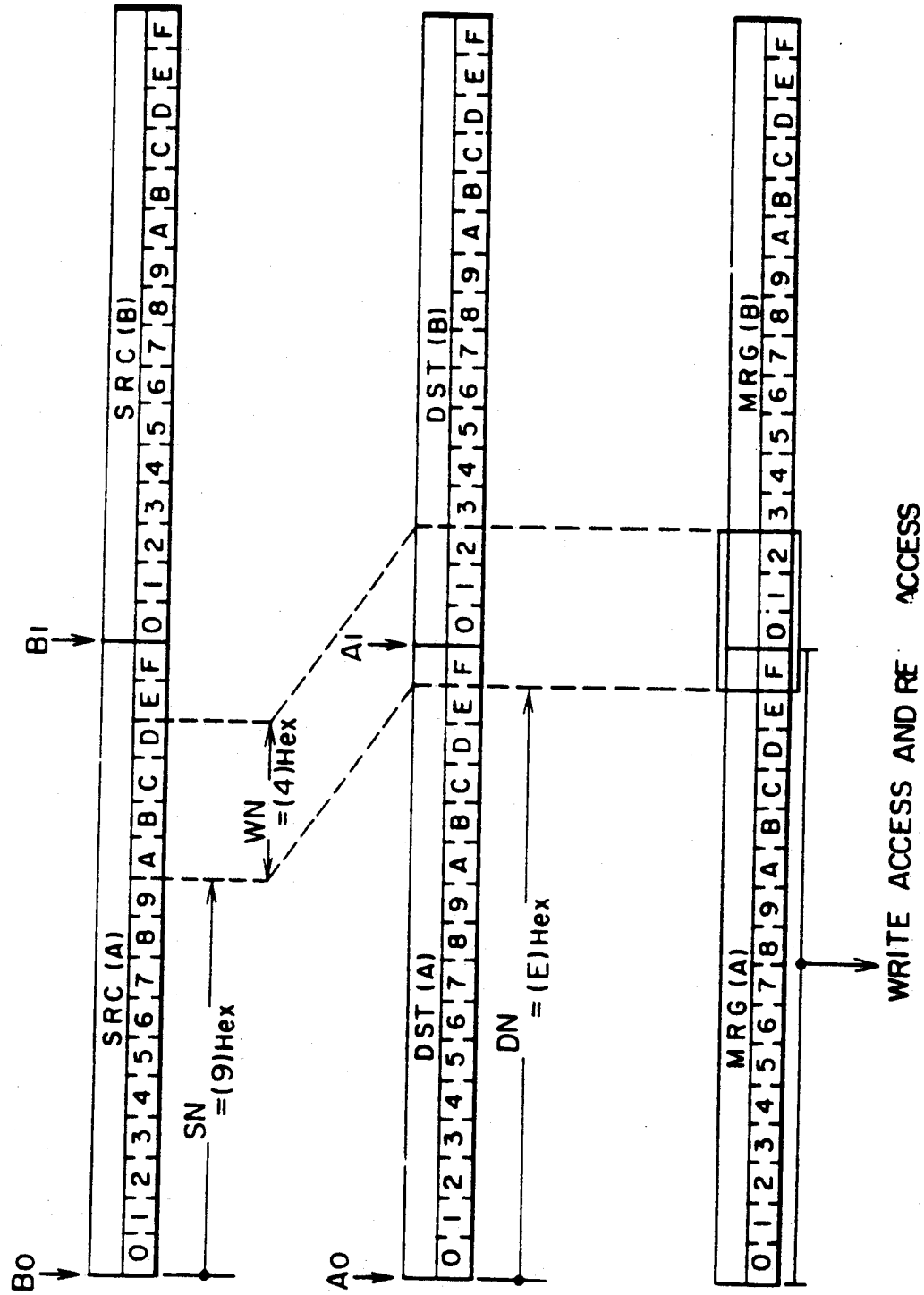
Figure 6:
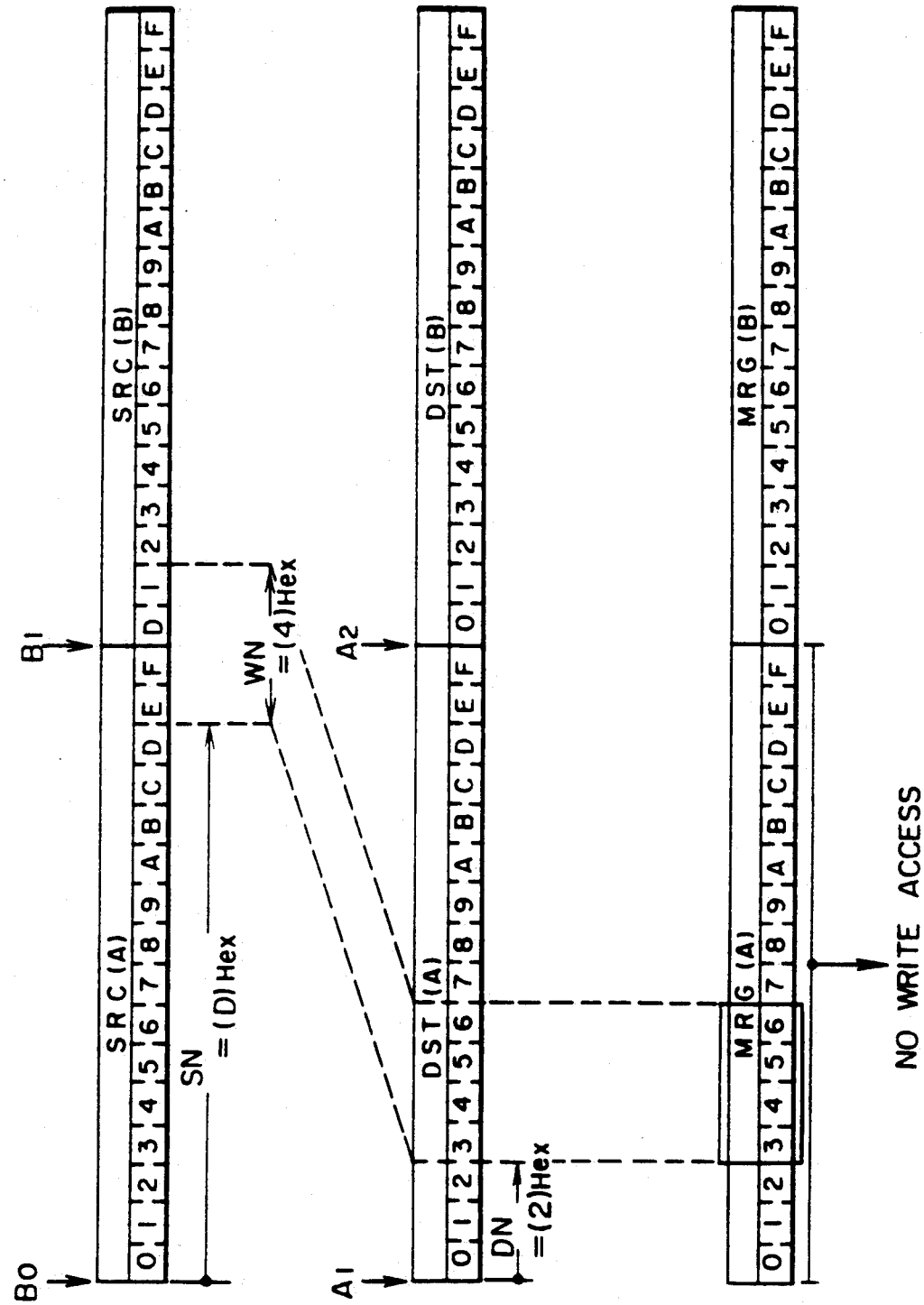

(3) By implementing bit address and word address control and memory access control on a hardware basis, the process can be simplified down to $\frac{1}{3}$ or less in terms of processing steps as compared with the conventional system (see FIGS. 3 and 11), whereby speed-up of process is accomplished.

(4) Since execution of operational processes for any number of bits at any bit position in word data can be made, speed-up of bit operation is accomplished.

We claim:

1. A bit operation unit for operating on data of an N bit data word stored in each of a plurality of addresses of a memory in response to a data processing command, comprising:

register means including a first register and a second register for respectively storing start addresses of bit data fields of source data and destination data and a third register for storing data indicating a variable length field of M bit data fields;

read-access means for read-accessing said N bit data words including at least a part of said M bit data fields indicated by said first and second registers, and read-accessing a consecutive N bit data word when said source data or said destination data straddles a word boundary of said N bit data words; and bit operating means for operating on said source data and said destination data.

2. A bit operation unit according to claim 1, wherein said bit operating means executes logic operations on said source data and said destination data.

3. A bit operation unit according to claim 2, wherein said bit operating means executes a transfer of said source data to corresponding bit positions of said destination data as one of said logic operations.

4. A bit operation unit according to claim 1, wherein said bit operating means executes arithmetic operations on said source data and said destination data.

5. A bit operation unit according to claim 1, wherein said source data and said destination data are image data.

6. A bit operation unit according to claim 1, further comprising, means for obtaining new start addresses of said M bit data fields respectively corresponding to said source data and said destination data with said start addresses stored in said first and second registers and said data indicating a variable length field of M bit data fields stored in said third register.

7. A bit operation unit according to claim 6, further comprising, means for renewing at least one of the memory addresses of said N bit data words corresponding to said source data and said destination data in accordance with said new start addresses.

8. A bit operation unit according to claim 1, wherein said memory addresses are word addresses.

9. An operational processing unit for operating on an N bit fixed-length data word stored in each of a plurality of memory address positions of a memory, comprising:

size register means for storing size data M, said M being an integer;

data processing means for processing source and destination data, said source and destination data having a data size of M, respectively;

address register means for storing start bit positions of said source and destination data to be processed by said data processing means, each of said start bit positions indicating an arbitrary position of said N bit fixed-length data words; and memory access means for read/write accessing said source and destination data from/to said memory, generating memory address positions corresponding to N bit fixed-length data words including at least a part of said source and destination data having said start bit positions stored in said address register means and generating a memory address position corresponding to a consecutive N bit fixed-length data word when said source or destination data straddles a word boundary of the N bit fixed-length data word.

10. An operational processing unit according to claim 9, further comprising, address generating means for producing next start bit positions of said source and destination data to be successively processed by said data processing means in response to said start bit positions stored in said address register means and said size data M stored in said size register means, said next start bit positions being stored in said address register means.

11. An operational processing unit for operating on an N bit fixed-length data word stored in each of a plurality of memory address positions of a memory, comprising:

data processing means for processing source and destination data, said source and destination data being M bit variable length data, respectively;

size register means for storing size data indicating a size of said M bit variable length data;

address register means for storing start bit positions of said source and destination data, each of start bit positions indicating an arbitrary position of a N bit fixed-length data words; and memory access means for read/write accessing said source and destination data from/to said memory, generating memory address positions corresponding to N bit fixed-length data words including said source and destination data indicated by said address register means to provide said N bit fixed-length data words including said source and destination data from said memory to said data processing means and generating a memory address position corresponding to a consecutive N bit fixed-length data word when said source or destination data straddles a word boundary of said N bit fixed-length data words.

12. An operational processing unit according to claim 11, wherein said address register means includes an upper part for storing a word address indicating one of the N bit fixed-length data words stored in the memory and a lower part for storing a bit address indicating a start bit position of said M bit variable length data in said one N bit fixed-length data word indicated by said word address of said upper part, and wherein said memory access means generates the memory address position in accordance with said word address of said upper part.

13. An operation processing unit according to claim 12, wherein said memory access means generates a memory address position of said N bit fixed-length data words including a part of said M bit variable length data to be processed by said data processing means in accordance with said size data, said word address, and said bit address.

14. An operational processing unit according to claim 13, wherein the memory access to N bit fixed-length data words including said M bit variable length data to be processed by said data processing means are executed in accordance with the sum of said size data and said bit address.

15. An operational processing unit according to claim 14, wherein a start bit position of a next one of said M bit variable length data to be processed by said data processing means in said N bit fixed-length data words is determined by the sum of said size data and said bit address.

16. An operational processing unit according to claim 12, wherein said data processing means includes means for bit-aligning a bit boundary designated by said bit address.

17. An operational processing unit according to claim 12, wherein said data processing means includes data mask means for masking at least one bit except said M bit variable length data to be processed in a N bit fixed-length data word.

18. An operational processing unit according to claim 11, wherein said data processing means executes logic operations on said source and destination data.

19. An operational processing unit according to claim 18, wherein said data processing means executes a transfer of said source data to corresponding bit positions of said destination data as one of said logic operations.

20. An operational processing unit according to claim 11, wherein said data processing means executes arithmetic operations on said source and destination data.

21. An operational processing unit according to claim 11, wherein each of said N bit fixed-length data words is image data.

22. An operational processing unit according to claim 11, wherein each of said N bit fixed-length data words is pixel data.

23. An operation device for operating on data of an N bit data word stored in each of a plurality of addresses of a memory in response to a data processing command, comprising:

register means including a first register and a second register for respectively storing start addresses of bit data fields of source data and destination data and a third register for storing data indicating a variable length field of M bit data fields;

read-access means for read-accessing said N bit data words including at least a part of said M bit data fields indicated by said first and second registers, and read-accessing a consecutive one of said N bit data words when said source data or said destination data straddles a word boundary of said N bit data words; and data processing means for processing said source data and said destination data.

24. An operation device according to claim 23, further comprising:

means for obtaining new start addresses of said M bit data fields respectively corresponding to said source data and said destination data with said start addresses stored in said first and second registers and said data field indicating a variable length of M bit data fields stored in said third register.

25. An operation device according to claim 24, further comprising:
means for renewing at least one of the memory addresses of said N bit data words corresponding to said source data and said destination data in accordance with said new start addresses.

26. An operational processing device for operating on an N bit fixed-length data word stored in each of a plurality of memory address positions of a memory, comprising:
data processing means for processing source and destination data, said source and destination data having a data size of M, respectively;
address register means for storing start bit positions of said source and destination data to be processed by said data processing means, each of said start bit positions indicating an arbitrary position of said N bit fixed-length data words; and
memory access means for read/write accessing said source and destination data from/to said memory, generating memory address positions corresponding to N bit fixed-length data words including at least a part of said source and destination data having said start bit positions stored in said address register means and generating a memory address position corresponding to a consecutive one of said N bit fixed-length data words when said source or destination data straddles a word boundary of said N bit fixed-length data words.

27. An operational processing device according to claim 26, further comprising:
address generating means for producing next start bit positions of said source and destination data to be successively processed by said data processing means in response to said start bit positions stored in said address register means and said data size of M, said next start bit positions being stored in said address register means.

28. An operational processing device according to claim 26, wherein said data processing means includes means for bit-aligning a bit boundary designated by said start bit positions.

29. An operational processing device according to claim 26, wherein said data processing means includes data mask means for masking at least one bit except said source or destination data to be processed in said N bit fixed-length data word.

30. An operational processing device according to claim 26, wherein said data processing means executes logic operations on said source and destination data.

31. An operational processing device according to claim 26, wherein said data processing means executes arithmetic operations on said source and destination data.

32. An operational processing device according to claim 26, wherein each of said N bit fixed-length data words is image data.

33. An operational processing device for operating on an N bit data word stored in each of a plurality of memory address positions of a memory, comprising:
size register means for storing variable length size data of M;
data processing means for processing source and destination data, said sizes of said source and destination data being M, respectively;
memory access means for read/write accessing said source and destination data from/to said memory, generating memory address positions corresponding to N bit data words including said source and destination data to provide said N bit data words including said source and destination data to said data processing means and generating a memory address position corresponding to a consecutive one of said N bit data words when said source or destination data straddles a word boundary of said N bit data words.

34. An operational processing device for processing N bit fixed-length word data stored in each of a plurality of memory address positions, comprising:
memory access means for accessing said N bit fixed-length word data by generating memory address positions corresponding to N bit fixed-length word data including at least a part of source and destination data having an arbitrary M bit width which starts from an arbitrary bit position of said N bit fixed-length word data and straddles a word boundary of said N bit fixed-length word data; and
data processing means for processing said source and destination data accessed by said memory access means.

35. An operational processing device according to claim 34, further comprising:
a plurality of first data registers for temporarily storing said N bit fixed-length word data including said source data to be processed; and
a plurality of second data registers for temporarily storing said N bit fixed-length word data including said destination data to be processed.

36. An operational processing device according to claim 34, wherein when said source data straddles said word boundary, said data processing means changes said destination data to said source data.

37. An operational processing device according to claim 34, wherein when said destination data straddles said word boundary, said data processing means changes said destination data to said source data.

38. An operational processing device according to claim 34, wherein
said data processing means executes a bit block transfer of said source data to corresponding bit positions of said destination data.

39. An operational processing device according to claim 34, wherein
said N bit fixed-length word data is image data.

40. An operational processing device according to claim 34, wherein
said N bit fixed-length word data is pixel data.

41. An operational processing device according to claim 34, wherein said data processing means executes logic operations on said source and destination data.

42. An operational processing devices according to claim 41, wherein said data processing means executes a transfer of said source data to corresponding bit positions of said destination data as one of said logic operations.

43. An operational processing device according to claim 34, wherein said data processing means executes arithmetic operations on said source and destination data.

44. An operational processing device according to claim 34, wherein said data processing means includes means for bit-aligning a bit boundary of said source and destination data.

45. An operational processing device according to claim 34, wherein said data processing device includes data mask means for masking at least one bit except said source or destination data to be processed in said N bit fixed-length word data.

46. A bit field processing device for processing N bit word data stored in each of a plurality of addresses of a memory device, comprising:
 memory access means for accessing said N bit word data by generating addresses corresponding to N bit word data including at least a part of source and destination data, at least one of said source and destination data having an arbitrary M bit width which straddles a word boundary of said N bit word data from an arbitrary bit position of said N bit word data; and
 bit field processing means for processing said source and destination data accessed by said memory access means.

47. A bit field processing device according to claim 46, further comprising:
 a plurality of first data registers for temporarily storing said N bit word data including said source data to be processed.

48. A bit field processing device according to claim 46, further comprising:
 a plurality of second data registers for temporarily storing said N bit word data including said destination data to be processed.

49. A bit field processing device according to claim 46, wherein
 said bit field processing means executes a bit block transfer of said source data to corresponding bit positions of said destination data.

50. A bit field processing device according to claim 46, wherein
 said N bit word data is image data.

51. A bit field processing device according to claim 46, wherein
 said N bit word data is pixel data.

52. A bit field processing devices according to claim 46, said bit field processing means executes logic operations on said source and destination data.

53. A bit field processing device according to claim 52, wherein said bit field processing means executes a bit block transfer of said source data to corresponding bit positions of said destination data as one of said logic operations.

54. A bit field processing devices according to claim 46, wherein
 said bit field processing means executes arithmetic operations on said source and destination data.

55. A bit field processing devices according to claim 46, wherein
 said bit field processing means executes a bit-alignment of said source and destination data.

56. A bit field processing device according to claim 46, wherein
 said bit field processing means executes a data masking of at least one bit except said source or destination data to be processed in said N bit data word.

57. A bit field processing device for processing N bit word data stored in each of a plurality of addresses of a bit map memory, comprising:
 memory access means for accessing said N bit word data by generating addresses corresponding to N bit word data including at least a part of source and destination data, said source and destination data respectively belonging to source and destination rectangular areas, each of said rectangular areas is obtained from an arbitrary bit position of said N bit word data, and at least one of said source and destination data having an arbitrary M bit width which straddles a word boundary of said N bit word data; and
 bit field processing means for processing said source and destination data accessed by said memory access means.

58. A bit field processing device according to claim 57, wherein
 said bit field processing means executes a bit block transfer of said source data to corresponding bit positions of said destination data.

59. A bit field processing device according to claim 57, wherein
 said N bit word data is image data.

60. A bit field processing device according to claim 57, wherein
 said N bit word data is pixel data.

61. A bit field processing devices according to claim 57, wherein
 said bit field processing means executes logic operations on said source and destination data.

62. A bit field processing device according to claim 61, wherein
 said bit field processing means executes a bit block transfer of said source data to corresponding bit positions of said destination data as one of said logic operations.

63. A bit field processing device according to claim 57, wherein
 said bit field processing means executes arithmetic operations on said source and destination data.

64. A bit field processing device according to claim 57, wherein
 said bit field processing means executes a bit-alignment of said source and destination data.

65. A bit field processing device according to claim 57, wherein
 said bit field processing means executes a data masking of at least one bit except said source or destination data to be processed in said N bit data word.

66. An operational processing unit for operating on an N bit fixed-length data word stored in each of a plurality of memory address positions of a memory, comprising:
 data processing means for processing source and destination data, said source and destination data being M bit variable length data, respectively;
 size register means for storing size data indicating a size of said M bit variable length data;
 address register means for storing start bit positions of said source and destination data, each of said start bit positions indicating an arbitrary position of a N bit fixed-length data word; and
 memory access means for read/write accessing said source and destination data from/to said memory, generating memory address positions corresponding to N bit fixed-length data words including said source and destination data indicated by said address register means to provide said N bit fixed-length data words including said source and destination data from said memory to said data processing means and generating a memory address position corresponding to a consecutive one of said N bit fixed-length data words when said source or destination data straddles a word boundary of said N bit fixed-length data words;

wherein said address register means includes an upper part for storing a word address indicating one of said N bit fixed-length data words stored in said memory and a lower part for storing a bit address indicating a start bit position of said M bit variable length data in said one N bit fixed-length data word indicated by said word address of said upper part, said memory access means generates a memory address position in accordance with said word address of said upper part;

wherein said memory access means generates a memory address position of a N bit fixed-length data word including a part of said M bit variable length data to be processed by said data processing means in accordance with said size data, said word address and said bit address;

wherein memory accesses to the N bit fixed-length data words including said M bit variable length data to be processed by said data processing means are executed in accordance with the sum of said size data and said bit address; and wherein a start bit position of a next one of said M bit variable length data to be processed by said data processing means in said one N bit fixed-length data word is determined by the sum of said size data and said bit address.

67. An operational processing unit according to claim 66, wherein said data processing means includes data mask means for masking at least one bit except said M bit variable length data to be processed in said one N bit fixed-length data word.

68. An operational processing unit according to claim 66, wherein said data processing means executes logic operations on said source and destination data.

69. An operational processing unit according to claim 66, wherein said data processing means executes a transfer of said source data to corresponding bit positions of said destination data as one of said logic operations.

70. An operational processing unit according to claim 66, wherein said data processing means includes means for bit-aligning a bit boundary designated by said bit address.

71. An operational processing unit according to claim 66, wherein each of said N bit fixed-length data words is image data.

72. An operational processing unit for operating on an N bit fixed-length data word stored in each of a plurality of memory address positions of a memory, comprising:

data processing means for processing source and destination data, said source and destination data being M bit variable length data, respectively;

size register means for storing size data indicating a size of said M bit variable length data;

address register means for storing start bit positions of said source and destination data, each of said start bit positions indicating an arbitrary position of said N bit fixed-length data word; and memory access means for read/write accessing said source and destination data from/to said memory, generating memory address positions corresponding to N bit fixed-length data words including said source and destination data indicated by said address register means to provide said N bit fixed-length data words including said source and destination data from said memory to said data processing means and generating a memory address position corresponding to a consecutive one of said N bit fixed-length data words when said source or destination data straddles a word boundary of said N bit fixed-length data words;

wherein said address register means includes an upper part for storing a word address indicating one of said N bit fixed-length data words stored in said memory and a lower part for storing a bit address indicating a start bit position of said M bit variable length data in the N bit fixed-length data word indicated by said word address of said upper part, and wherein said memory access means generates a memory address position in accordance with said word address of said upper part;

wherein said memory access means generates a memory address position of a N bit fixed-length data word including a part of said M bit variable length data to be processed by said data processing means in accordance with said size data, said word address and said bit address;

wherein memory accesses to the N bit fixed-length data words including said M bit variable length data to be processed by said data processing means are executed in accordance with the sum of said size data and said bit address;

wherein a start bit position of a next one of said M bit variable length data to be processed by said data processing means in said one N bit fixed-length data word is determined by the sum of said size data and said bit address;

wherein said data processing means includes data mask means for masking at least one bit except said M bit variable length data to be processed in the N bit fixed-length data word; and wherein said data processing means executes logic operations on said source and destination data.

73. An operational processing unit according to claim 72, wherein each of said N bit fixed-length data words is pixel data.

74. An operational processing unit according to claim 73, wherein said data processing means executes a transfer of said source data to corresponding bit positions of said destination data as one of said logic operations.

75. An operational processing unit according to claim 73, wherein said data processing means executes a logic operations on said source and destination data.

76. An operational processing unit according to claim 73, wherein said data processing means executes arithmetic operations on said source and destination data.

77. An operational processing unit according to claim 73, wherein each of said N bit fixed-length data words is image data.

78. An operational processing unit according to claim 73, wherein each of said N bit fixed-length data words is pixel data.

79. An operational processing unit for operating on an N bit fixed-length data word stored in each of a plurality of memory address positions of a memory, comprising:

a processing circuit which processes source and destination data, said source and destination data being M bit variable length data, respectively;

a first storage which stores size data indicating a size of said M bit variable length data;

a second storage which stores bits indicating start bit positions of said source and destination data, each of said start bit positions indicating an arbitrary position of a N bit fixed-length data word; and a memory access circuit operating to perform read/write accessing of said source and destination data from/to said memory, generating memory address positions corresponding to N bit fixed-length data words including said source and destination data indicated by said second storage to provide said N bit fixed-length data words including said source and destination data from said memory to said processing circuit and generating a memory address position corresponding to a consecutive one of said N bit fixed-length data words when said source or destination data straddles a word boundary of said N bit fixed-length data words.

80. An operational processing unit according to claim 79, wherein said second register includes an upper part for storing a word address indicating one of the N bit fixed-length data words stored in said memory and a lower part for storing a bit address indicating a start bit position of said M bit variable length data in the N bit fixed-length data word indicated by said word address of said upper part, and wherein said memory access circuit generates the memory address position in accordance with said word address of said upper part.

81. An operational processing unit according to claim 80, wherein said memory access circuit generates a memory address position of said N bit fixed-length data words including a part of said M bit variable length data to be processed by said processing circuit in accordance with said size data, said word address, and said bit address.

82. An operational processing unit according to claim 80, wherein said processing circuit includes a circuit for bit-aligning a bit boundary designated by said bit address.

83. An operational processing unit according to claim 80, wherein said processing circuit includes a data mask circuit for masking at least one bit except said M bit variable length data to be processed in a N bit fixed-length data word.

84. An operational processing unit according to claim 79, wherein the memory accesses to the N bit fixed-length data words including said M bit variable length data to be processed by said processing circuit are executed in accordance with the sum of said size data and said bit address.

85. An operational processing unit according to claim 84, wherein a start bit position of a next one of said M bit variable length data to be processed by said data processing means in said N bit fixed-length data words is determined by the sum of said size data and said bit address.

86. An operational processing unit according to claim 79, wherein said processing circuit executes logic operations on said source and destination data.

87. An operational processing unit according to claim 79, wherein said processing circuit executes arithmetic operations on said source and destination data.

88. An operational processing unit according to claim 86, wherein said processing circuit executes a transfer of said source data to corresponding bit positions of said destination data as one of said logic operations.

89. An operational processing unit according to claim 79, wherein each of said N bit fixed-length data words is image data.

90. An operational processing unit according to claim 79, wherein each of said N bit fixed-length data words is pixel data.

91. An operational processing unit for operating on an N bit fixed-length data word stored in each of a plurality of memory address positions of a memory, comprising:

a processing circuit which processes source and destination data, said source and destination data being M bit variable length data, respectively;

a storage which stores size data indicating a size of said M bit variable length data and bits indicating start bit positions of said source and destination data, each of said start bit positions indicating an arbitrary position of a N bit fixed-length data word; and a circuit operating to perform read/write accessing of said source and destination data from/to said memory, generating memory address positions corresponding to N bit fixed-length data words including said source and destination data indicated by said storage to provide said N bit fixed-length data word including said source and destination data from said memory to said processing circuit and generating a memory address position corresponding to a consecutive one of said N bit fixed-length data words when said source or destination data straddles a word boundary of said N bit fixed-length data words.

92. An operational processing unit according to claim 91, wherein said storage includes an upper part for storing a word address indicating one of the N bit fixed-length data words stored in said memory and a lower part for storing a bit address indicating a start bit position of said M bit variable length data in the N bit fixed-length data word indicated by said word address of said upper part, and wherein said circuit generates the memory address position in accordance with said word address of said upper part.

93. An operational processing unit according to claim 92, wherein said circuit generates a memory address position of said N bit fixed-length data words including a part of said M bit variable length data to be processed by said processing circuit in accordance with said size data, said word address, and said bit address.

94. An operational processing unit according to claim 93, wherein the memory accesses to the N bit fixed-length data words including said M bit variable length data to be processed by said processing circuit are executed in accordance with the sum of said size data and said bit address.

95. An operational processing unit according to claim 94, wherein a start bit position of a next one of said M bit variable length data to be processed by said processing circuit in said N bit fixed-length data words is determined by the sum of said size data and said bit address.

96. An operational processing unit according to claim 92, wherein said processing circuit includes a circuit for bit-aligning a bit boundary designated by said bit address.

97. An operational processing unit according to claim 92, wherein said processing circuit includes a data mask circuit for masking at least one bit except said M bit variable length data to be processed in a N bit fixed-length data word.

98. An operational processing unit according to claim 91, wherein said processing circuit executes logic operations on said source and destination data.

99. An operational processing unit according to claim 98, wherein said processing circuit executes a transfer of said source data to corresponding bit positions of said destination data as one of said logic operations.

100. An operational processing unit according to claim 91, wherein said processing circuit executes arithmetic operations on said source and destination data.

101. An operational processing unit according to claim 91, wherein each of said N bit fixed-length data words is image data.

102. An operational processing unit according to claim 91, wherein each of said N bit fixed-length data words is pixel data.

103. An operational processing unit according to claim 91, wherein each of said N bit fixed length data words is pixel data.

104. A method of operating on an N bit fixed-length data word stored in each of a plurality of memory address positions of a memory, comprising the steps of:
  processing source and destination data, said source and destination data being M bit variable length data, respectively;
  storing size data indicating a size of said M bit variable length data;
  storing bits indicating start bit positions of said source and destination data, each of said start bit positions indicating an arbitrary position of a N bit fixed-length data word;
  read/wrote accessing said source and destination data from/to the memory;
  generating memory address positions corresponding to N bit fixed-length data words including said source and destination data indicated by said bits indicating start bit positions to obtain said N bit fixed-length data words including said source and destination data from said memory for processing; and
  generating a memory address position corresponding to a consecutive one of said N bit fixed-length data words when said source or destination data straddles a word boundary of said N bit fixed-length data words.

105. A method according to claim 104 wherein the step of storing bits includes the steps of:
  storing in an upper part of a storage a word address indicating one of the N bit fixed-length data words stored in the memory; and
  storing in a lower part of said storage a bit address indicating a start bit position of said M bit variable length data in the N bit fixed-length data word indicated by said word address of same upper part; and
  said step of generating memory address positions includes a step of:
  generating a memory address position in accordance with said word address of said upper part.

106. A method according to claim 105, wherein said step of generating a memory address includes a step of:
  generating a memory address position of said N bit fixed-length data words including a part of said M bit variable length data to be processed by said processing step in accordance with said size data, said word address, and said bit address.

107. A method according to claim 106, wherein said step of read/write accessing the N bit fixed-length data words including said M bit variable length data to be processed by said data processing means is executed in accordance with the sum of said size data and said bit address.

108. A method according to claim 107, further comprising a step of:
  determining a start bit position of a next one of said M bit variable length data to be processed by said processing step in said N bit fixed-length words by the sum of said size data and said bit address.

109. A method according to claim 105, wherein said processing step includes a step of:
  bit-aligning a bit boundary designated by said bit address.

110. A method according to claim 105, wherein said step includes a step of:
  masking at least one bit except said M bit variable length data to be processed in the N bit fixed-length data word.

111. A method according to claim 104, wherein said processing step includes a step of:
  executing logic operations on said source and destination data.

112. A method according to claim 111, wherein said processing step includes a step of:
  executing a transfer of said source data to corresponding bit positions of said destination data as one of said logic operations.

113. A method according to claim 104, wherein said processing step includes a step of:
  executing arithmetic operations on said source and destination data.

114. A method according to claim 104, wherein each of said N bit fixed-length data words is image data.

115. A method according to claim 104, wherein each of said N bit fixed-length data words is pixel data.

116. A method of operating on N bit fixed-length data words stored in each of a plurality of memory address positions of a memory, comprising the steps of:
  processing source and destination data in a data processor, said source and destination data being M bit variable length source and destination data, respectively;
  storing data representing the size of said M bit variable length data;
  storing start bit positions for each of said source and destination data, each of said start bit positions indicating an arbitrary position of a N bit fixed-length data word;
  transferring said source and destination data between the memory and the data processor by generating memory address positions corresponding to the N bit fixed-length data words which include the source and destination data indicated by said start bit positions to transfer N bit fixed-length data words including said source and destination data between the memory and the data processor and generating a memory address position corresponding to the next consecutive N bit fixed-length data word when said source or destination data has a length extending beyond the word boundary of the N bit fixed-length data word containing said start bit position to also transfer said next consecutive N bit fixed-length data word between said memory and said data processor.

117. A method of processing data in the form of N bit words stored in each of a plurality of addresses of a bit map memory, comprising the steps of:
  accessing said N bit words by generating addresses corresponding to the N bit words including at least a part of a source data and destination data, respectively, said source and destination data corresponding to respective source and destination rectangular areas, each of said rectangular areas being stored starting at an arbitrary bit position in one of said N bit words, and at least one of said source and destination data having an arbitrary M bit width which reaches beyond the word boundary of the N bit word containing the starting bit position for said one of said source and destination data; and processing said source and destination data accessed by said memory access means.

118. The method according to claim 117, further including comprising the steps of:

accessing the next consecutive N bit word for the source and/or destination data which extends beyond said word boundary.

119. A image processor for processing image data of an N (N is integer more than zero) bit fixed-length data words stored in respective areas of a plurality of memory address positions of an image memory for a bit map display as source and destination data, said source and destination data being M (M is integer more than zero) bit variable length image data, comprising:

a first storage which stores size data indicating a size of said M bit variable length image data;

a second storage which stores bits indicating start bit positions of said source and destination data, each of said start bit positions indicating an arbitrary position of an N bit fixed-length data word; and a memory access circuit for reading said source data from said image memory, by generating memory address positions corresponding to N bit fixed-length data words including said source data indicated by said second storage, writing destination data to said image memory by generating memory address positions corresponding to N bit fixed-length data words including said destination data indicated by said second storage, and generating a memory address position corresponding to a consecutive one of said N bit fixed-length data words when said source or destination data straddles a word boundary of said N bit fixed-length data words.

120. An image processor connected to an image memory having N (N is integer more than zero) bit fixed-length data words stored in respective areas of a plurality of memory address positions of the image memory, for processing data at source and destination locations of said image memory, said source and destination locations each having stored therein M (M is integer more than zero) bit variable length image data, comprising:

a first storage which stores size data indicating a size of said M bit variable length image data;

a second storage which stores bits indicating start bit positions of said source and destination data, each of said start bit positions indicating an arbitrary position of an N bit fixed-length data word; and a circuit for transferring M bit variable length image data from said source location to said destination location by generating memory address positions corresponding to N bit fixed-length data words including said source location at the start bit position indicated by said second storage, generating memory address positions corresponding to N bit fixed-length data words including said destination location at the star bit position indicated by said second storage and generating a memory address position corresponding to a consecutive one of said N bit fixed-length data words when said source location or said destination location straddles a word boundary of said N bit fixed-length data words.

121. An image processor for operating on image data of N (N is integer more than zero) bit fixed-length data words stored in respective areas of a plurality of memory address positions of an image memory for a bit map display as source and destination data, said source and destination data being M (M is integer more than zero) bit variable length image data, comprising:

a processing circuit which processes said source and destination data;

a first storage which stores size data indicating a size of said M bit variable length image data;

a second storage which stores bits indicating start bit positions of said source and destination data, each of said start bit positions indicating an arbitrary position of an N bit fixed-length data word; and an adding unit for adding said start bit positions of said source and destination data to said size data indicating a size of said M bit variable length image data; and a memory access circuit operating to perform read/write accessing of said source and destination data from/to said image memory, generating memory address positions corresponding to N bit fixed-length data words including said source and destination data indicated by said second storage to provide said N bit fixed-length data words including said source and destination data from said image memory to said processing circuit and generating a memory address position corresponding to a consecutive one of said N bit fixed-length data words responsive to a result of adding operation performed by said adding unit when said source or said destination data straddles a word boundary of said N bit fixed-length data words.

122. An image processor according to claim 121, wherein said memory access circuit comprises:

a word address adder for receiving a signal from said adding unit; and a memory access control circuit, responsive to the result of the adding operation performed by said adding unit, for controlling generation of a memory address position corresponding to a consecutive one of said N bit fixed-length data words when said source or destination data straddles a word boundary of said N bit fixed-length data words.

123. An image processor for operating on image data of N (N is integer more than zero) bit fixed-length data words stored in respective areas of a plurality of memory address positions of an image memory for a bit map display as source and destination data, said source and destination data being M (M is integer more than zero) bit variable length image data, comprising:

a processing circuit which processes said source and destination data;

a first storage which stores size data indicating a size of said M bit variable length image data;

a second storage which stores bits indicating start bit positions of said source and destination data, each of said start bit positions indicating an arbitrary position of an N bit fixed-length data word; and a memory access circuit operating to perform read/write accessing of said source and destination data from/to said image memory, generating memory address positions corresponding to N bit fixed-length data words including said source and destination data indicated by said second storage to provide said N bit fixed-length data words including said source and destination data from said image memory to said processing circuit and generating a memory address position corresponding to a consecutive one of said N bit fixed-length data words based on said size data and start bit positions of said source or destination data when said source or destination data straddles a word boundary of said N bit fixed-length data words.

124. An image processor for processing image data of an N (N is integer more than zero) bit data word stored in each of a plurality of addresses of an image memory used for a bit map display in response to an image data processing command, comprising:

register means including a first register and a second register for respectively storing start addresses of bit data fields of source image data and destination image data and a third register for storing data indicating a variable length field of M (M is integer. more than zero) bit image data fields;

read-access means for read-accessing said N bit data words including at least a part of said M bit image data fields indicated by said first and second registers, and read-accessing a consecutive N bit data word when said source image data or said destination image data straddles a word boundary of said N bit data words; and bit operating means for operating on said source image data and said destination image data.

125. An image processor according to claim 124, wherein said bit operating means executes logic operations on said source image data and said destination image data.

126. An image processor according to claim 125, wherein said bit operating means executes a transfer of said source image data to corresponding bit positions of said destination image data as one of said logic operations.

127. An image processor according to claim 124, wherein said bit operating means executes arithmetic operations on said source image data and said destination image data.

128. An image processor according to claim 124, further comprising:

means for obtaining new start addresses of said M bit image data fields respectively corresponding to said source image data and said destination image data with said start addresses stored in said first and second registers and said variable length field of said M bit image data fields stored in said third register.

129. An image processor according to claim 128, further comprising:

means for renewing at least one of the memory addresses of said N bit data words corresponding to said source image data and said destination image data in accordance with said new start addresses.

130. An image processor according to claim 124, wherein said memory addresses are word addresses.

131. An image processor for processing image data of an N (N is integer more than zero) bit fixed-length data word in each of a plurality of memory address positions of an image memory for a bit map display, comprising:

size register means for storing size image data M, said M being an integer more than zero;

data processing means for processing source and destination data, said source and destination data having an image data size indicated by said size image data M;

address register means for storing start bit positions of said source and destination data to be processed by said data processing means, each of said start bit positions indicating an arbitrary position of said N bit fixed-length data word; and memory access means for read/write accessing said source and destination data from/to said image memory, generating memory address positions corresponding to N bit fixed-length data words including at least a part of said source and destination data having said start bit positions stored in said address register means and generating a memory address position corresponding to a consecutive N bit fixed-length data word when said source or destination data straddles a word boundary of said N bit fixed-length data word.

132. An image processor according to claim 131, further comprising:

address generating means for producing next start bit positions of said source and destination data to be successively processed by said data processing means in response to said start bit positions stored in said address register means and said size image data M stored in said size register means, said next start bit positions being stored in said address register means.

133. An image processor for processing N (N is an integer more than zero) bit word data stored in each of a plurality of addresses of an image memory used for bit map display, comprising:

memory access means for accessing said N bit word data by generating addresses corresponding to N bit word data including at least a part of source and destination data, said source and destination data respectively belonging to source and destination rectangular areas, each of said rectangular areas is obtained from an arbitrary bit position of said N bit word data, and at least one of said source and destination data having an arbitrary M (M is an integer more than zero) bit width which straddles a word boundary of said N bit word data; and bit field processing means for processing said source and destination data accessed by said memory access means.

134. An image processor according to claim 133, wherein said bit field processing means executes a bit block transfer of said source data to corresponding bit positions of said destination data.

135. An image processor according to claim 133, wherein said N bit word data is image data.

136. An image processor according to claim 133, wherein said N bit word data is pixel data.

137. An image processor according to claim 133, wherein said bit field processing means executes logic operations on said source and destination data.

138. An image processor according to claim 137, wherein said bit field processing means executes a bit block transfer of said source data to corresponding bit positions of said destination data as one of said logic operations.

139. An image processor according to claim 133, wherein
said bit field processing means executes arithmetic operations on said source and destination data.

140. An image processor according to claim 133, wherein
said bit field processing means executes a bit-alignment of said source and destination data.

141. An image processor according to claim 133, wherein
said bit field processing means executes a data masking of at least one bit except said source or destination data to be processed in said N bit data word.

142. An image processor for processing image data of an N (N is integer more than zero) bit fixed-length data word stored in each of a plurality of memory address positions of an image memory for a bit map display, comprising:
a processing circuit which processes source and destination data, said source and destination data being M (M is integer more than zero) bit variable length image data;
a first storage which stores size data indicating a size of said M bit variable length image data;
a second storage which stores bits indicating start bit positions of said source and destination data, each of said start bit positions indicating an arbitrary position of an N bit fixed-length data word; and
a memory access circuit operating to perform read/write accessing of said source and destination data from/to said image memory, generating memory address positions corresponding to N bit fixed-length data words including said source and destination data indicated by a second storage to provide said N bit fixed-length data word including said source and destination data from said image memory to said processing circuit and generating a memory address position corresponding to a consecutive one of said N bit fixed-length data words when said source or destination data straddles a word boundary of said N bit fixed-length data words.

143. An image processor according to claim 142, wherein said second register includes an upper part for storing a word address indicating one of the N bit fixed-length data words stored in said memory and a lower part for storing a bit address indicating a start bit position of said M bit variable length data in the N bit fixed-length data word indicated by said word address of said upper part, and wherein said memory access circuit generates the memory address position in accordance with said word address of said upper part.

144. An image processor according to claim 143, wherein said memory access circuit generates a memory address position of said N bit fixed-length data words including a part of said M bit variable length data to be processed by said processing circuit in accordance with said size data, said word address, and said bit address.

145. An image processor according to claim 144, wherein the memory accesses to the N bit fixed-length data words including said M bit variable length data to be processed by said processing circuit are executed in accordance with the sum of said size data and said bit address.

146. An image processor according to claim 143, wherein said processing circuit includes a circuit for bit-aligning a bit boundary designated by said bit address.

147. An image processor according to claim 143, wherein said processing circuit includes a data mask circuit for masking at least one bit except said M bit variable length image data to be processed in an N bit fixed-length data word.

148. An image processor according to claim 142, wherein a start bit position of a next one of said M bit variable length image data to be processed by said processing in said N bit fixed-length data words is determined by the sum of said size data and said bit address.

149. An image processor according to claim 142, wherein said processing circuit executes logic operations on said source and destination data.

150. An image processor according to claim 149, wherein said processing circuit executes a transfer of said source data to corresponding bit positions of said destination data as one of said logic operations.

151. An image processor according to claim 142, wherein said processing circuit executes arithmetic operations on said source and destination data.

152. An image processor according to claim 142, wherein each of said N bit fixed-length data words is image data.

153. An image processor according to claim 142, wherein each of said N bit fixed-length data words is pixel data.

154. An image processor for processing image data of an N (N is integer more than zero) bit fixed-length data word stored in each of a plurality of memory address positions of an image memory for a bit map display, comprising:
a processing circuit which processes source and destination data, said source and destination data being M (M is integer more than zero) bit variable length data;
a storage which stores size data indicating a size of said M bit variable length data and bits indicating start bit positions of said source and destination data, each of said start bit positions indicating an arbitrary position of a N bit fixed-length data word; and
a circuit operating to perform read/write accessing of said source and destination data from/to said image memory, generating memory address positions corresponding to N bit fixed-length data words including said source and destination data indicated by said storage to provide said N bit fixed-length data word including said source and destination data from said image memory to said processing circuit and generating a memory address position corresponding to a consecutive one of said N bit fixed-length data words when said source or destination data straddles a word boundary of said N bit fixed-length data words.

155. An image processor according to claim 154, wherein said storage includes an upper part for storing a word address indicating one of the N bit fixed-length data words stored in said memory and a lower part for storing a bit address indicating a start bit position of said M bit variable length image data in the N bit fixed-length data word indicated by said word address of said upper part, and wherein said circuit generates the memory address position in accordance with said word address of said upper part.

156. An image processor according to claim 155, wherein said circuit generates a memory address position of said N bit fixed-length data words including a part of said M bit variable length image data to be processed by said processing circuit in accordance with said size data, said word address, and said bit address.

157. An image processor according to claim 156, wherein the memory accesses to the N bit fixed-length data words including said M bit variable length image data to be processed by said processing circuit are executed in accordance with the sum of said size data and said bit address.

158. An image processor according to claim 157, wherein a start bit position of a next one of said M bit variable length image data to be processed by said processing circuit in said N bit fixed-length data words is determined by the sum of said size data and said bit address.

159. An image processor according to claim 155, wherein said processing circuit includes a circuit for bit-aligning a bit boundary designated by said bit address.

160. An image processor according to claim 155, wherein said processing circuit includes a data mask circuit for masking at least one bit except said M bit variable length image data to be processed in an N bit fixed-length data word.

161. An image processor according to claim 155, wherein said processing circuit executes logic operations on said source and destination data.

162. An image processor according to claim 161, wherein said processing circuit executes a transfer of said source data to corresponding bit positions of said destination data as one of said logic operations.

163. An image processor according to claim 154, wherein said processing circuit executes arithmetic operations on said source and destination data.

164. An image processor according to claim 154, wherein each of said N bit fixed-length data words is image data.

165. A processing method of an image processor, said image processor processes image data of an N (N is integer more than zero) bit fixed-length data word stored in each of a plurality of memory address positions of an image memory used for a bit map display, said method comprising the steps of:

processing source and destination data, said source and destination data being M (M is integer more than zero) bit variable length image data;

storing size data indicating a size of said M bit variable length image data in a first storage of said image processor;

storing bits indicating start bit positions of said source and destination data in a second storage of said image processor, each of said start bit positions indicating an arbitrary position of an N bit fixed-length data word;

read/wrote accessing said source and destination data from/to the memory;

generating memory address positions corresponding to N bit fixed-length data words including said source and destination data indicated by said bits indicating start bit positions to obtain said N bit fixed-length data words including said source and destination data from said image memory for processing; and generating a memory address position corresponding to a consecutive one of said N bit fixed-length data words when said source or destination data straddles a word boundary of said N bit fixed-length data words.

166. A processing method of an image processor according to claim 165, wherein said second storage of the step of storing bits stores a word address indicating one of the N bit fixed-length data words in the image memory in an upper part thereof, and a bit address indicating a start bit position of said M bit variable length data in the N bit fixed-length data word indicated by said word address of the same upper part in a lower part thereof; and said step of generating memory address positions includes a step of:

generating a memory address position in accordance with said word address of said upper part.

167. A processing method of an image processor according to claim 166, wherein said step of generating a memory address includes a step of:

generating a memory address position of said N bit fixed-length data words including a part of said M bit variable length image data to be processed by said processing step in accordance with said size data, said word address, and said bit address.

168. A processing method of an image processor according to claim 167, wherein said step of read/write accessing the N bit fixed-length data words including said M bit variable length image data to be processed by said processing step is executed in accordance with the sum of said size data and said bit address.

169. A processing method of an image processor according to claim 168, further comprising a step of:

determining a start bit position of a next one of said M bit variable length data to be processed by said processing step in said N bit fixed-length words by the sum of said size data and said bit address.

170. A processing method of an image processor according to claim 166, wherein said processing step includes a step of:

bit-aligning a bit boundary designated by said bit address.

171. A processing method of an image processor according to claim 170, wherein said processing step includes a step of:

masking at least one bit except said M bit variable length data to be processed in the N bit fixed-length data word.

172. A processing method of an image processor according to claim 165, wherein said processing step includes a step of:

executing logic operations on said source and destination data.

173. A processing method of an image processor according to claim 172, wherein said processing step includes a step of:

executing a transfer of said source data to corresponding bit positions of said destination data as one of said logic operations.

174. A processing method of an image processor according to claim 165, wherein said processing step includes a step of:

executing arithmetic operations on said source and destination data.

175. A processing method of an image processor according to claim 165, wherein each of said N bit fixed-length data words is pixel data.

176. A processing method of an image processor, said image processor processes image data of N (N is integer more than zero) bit fixed-length data word stored in each of a plurality of memory address positions of an image memory used for a bit map display, said method comprising the steps of:

processing source and destination data, in said image processor, said source and destination data being M (M is integer more than zero) bit variable length source and destination image data;

storing data representing the size of said M bit variable length image data in a first storage of said image processor;

storing start bit positions for each of said source and destination data in a second storage of said image processor, each of said start bit positions indicating an arbitrary position in one of said N bit fixed-length data words; and transferring said source and destination data between the image memory and said image processor by generating memory address positions corresponding to the N bit fixed-length data words which include the source and destination data indicated by said start bit positions to transfer N bit fixed-length data words including said source and destination data between the image memory and said image processor and generating a memory address position corresponding to the next consecutive N bit fixed-length data word when said source or destination data has a length extending beyond the word boundary of the N bit fixed-length data word containing said start bit position to also transfer said next consecutive N bit fixed-length data word between said image memory and said image processor.

177. An image processing method of processing image data in the form of N bit words stored in each of a plurality of addresses of a bit map memory, comprising the steps of:

accessing said N bit words by generating addresses corresponding to the N bit fixed-length words including at least a part of a source data and destination data, respectively, said source and destination data corresponding to respective source and destination rectangular areas, each of said rectangular areas being stored starting at an arbitrary bit position in one of said N bit words, and at least one of said source and destination data having an arbitrary M bit width which reaches beyond the word boundary of the N bit word containing the starting bit position for said one of said source and destination data; and processing said source and destination data accessed by said memory access means.

178. An image processing method according to claim 177, further comprising the steps of:

accessing the next consecutive N bit word for the source and/or destination data which extends beyond said word boundary.

179. An image data processor for operating, during an operation period, on image data of N (N is integer more than zero) bit fixed-length data words stored in respective areas of a plurality of memory address positions of an image memory, said image data including source and destination data, said source and destination data being bit variable length image data, comprising:

a first storage which stores, during a given operation period, size data indicating a bit length of said bit variable length image data for said given operation period;

a second storage which stores information indicating start bit positions of said source and destination data, each of said start bit positions indicating an arbitrary position in an N bit fixed-length data word; and a memory access circuit, which reads said source data from said image memory by generating memory address positions corresponding to N bit fixed-length data words including said source data indicated by said second storage, and which writes destination data to said image memory by generating memory address positions corresponding to N bit fixed-length data words including said destination data indicated by said second storage and generating a memory address position corresponding to a consecutive one of said N bit fixed-length data words when said source or destination data straddles a word boundary of one of said N bit fixed-length data words.

180. An image data processor according to claim 179, wherein the sum of said size data of said first storage and said start bit positions of said second storage is used in said generating operation to generate a memory address position corresponding to a consecutive one of said N bit fixed-length data words when said source or destination data straddles a word boundary of one of said N bit fixed-length data words.

181. An image processor for operating on image data of N (N is integer more than zero) bit fixed-length data words stored in respective areas of a plurality of memory address positions of an image memory for a bit map display as source and destination data, said source and destination data being M (M is integer more than zero) bit variable length image data, comprising:

a processing circuit which processes said source and destination data;

a first storage which stores size data indicating a size of said M bit variable length image data;

a second storage which stores bits indicating start bit positions of said source and destination data, each of said start bit positions indicating an arbitrary position of an N bit fixed-length data word; and an adding unit for adding said start bit positions of said source data to said size data which indicates a size of said M bit variable length image data and adding said start bit position of said destination data to said size data which indicates a size of said M bit variable length image data; and a memory access circuit operating to perform read/write accessing of said source and destination data from/to said image memory, generating memory address positions corresponding to N bit fixed-length data words including said source and destination data indicated by said second storage to provide said N bit fixed-length data words including said source and destination data from said image memory to said processing circuit and generating a memory address position corresponding to next start bit positions of said source and destination data to be successively processed by said processing circuit in response to a result of the adding operation performed by said adding unit, said next start bit positions being stored in said second storage.

182. An image processor according to claim 181, wherein said memory access circuit generates memory address positions corresponding to next start bit positions of said source and destination data to be successively processed by said processing circuit, said generated memory address positions correspond to N bit fixed-length data words ranging from said N bit fixed-length data words including said source and destination data indicated by said second storage to said N bit fixed-length data words including said source and destination data indicated by the result of the adding operation performed by said adding unit.

* * * * *